United States Patent

Nakagawa

[11] Patent Number: 5,335,016
[45] Date of Patent: Aug. 2, 1994

[54] IMAGE DATA COMPRESSING/CODING APPARATUS

[75] Inventor: Chihiro Nakagawa, Tokyo, Japan

[73] Assignee: Olympus Optical Co., Ltd., Tokyo, Japan

[21] Appl. No.: 824,366

[22] Filed: Jan. 23, 1992

[30] Foreign Application Priority Data

Jan. 29, 1991 [JP] Japan ................. 3-026702

[51] Int. Cl.$^5$ .......................................... H04N 7/133
[52] U.S. Cl. .................................... 348/405; 348/220
[58] Field of Search .............. 358/133, 136, 310, 335; 360/8; H04N 7/133

[56] References Cited

U.S. PATENT DOCUMENTS

| | | | |
|---|---|---|---|
| 4,894,713 | 1/1990 | Delogne et al. | 358/133 |
| 5,045,853 | 9/1991 | Astle et al. | 358/133 |
| 5,073,820 | 12/1991 | Nakagawa et al. | 358/133 |
| 5,079,621 | 1/1992 | Daly et al. | 358/133 |

Primary Examiner—Tommy P. Chin
Assistant Examiner—Richard Lee
Attorney, Agent, or Firm—Frishauf, Holtz, Goodman & Woodward

[57] ABSTRACT

An apparatus for compressing and coding the image data for each block wherein the image data is first divided into a plurality of image data of the blocks and then the image data of the block is subjected to orthogonal transformation, quantization, and variable length coding. Before the actual coding process, a statistical process is performed to obtain the amount of code data for the respective blocks, an optimum quantization step coefficient for the orthogonal transformation coefficients of the AC components based on the amount of code data for the block and the reference amount of code data, and the amount of code data of the orthogonal transformation coefficients of the AC components for the block. In the actual coding process, the provisional quantization step is used for quantizing the orthogonal transformation coefficients of the DC component and the optimum quantization step is used for quantizing the orthogonal transformation coefficients of the AC component. The coding of the orthogonal transformation coefficients of the AC components is stopped when the amount of code data of the block exceeds the assigned amount of code data.

19 Claims, 7 Drawing Sheets

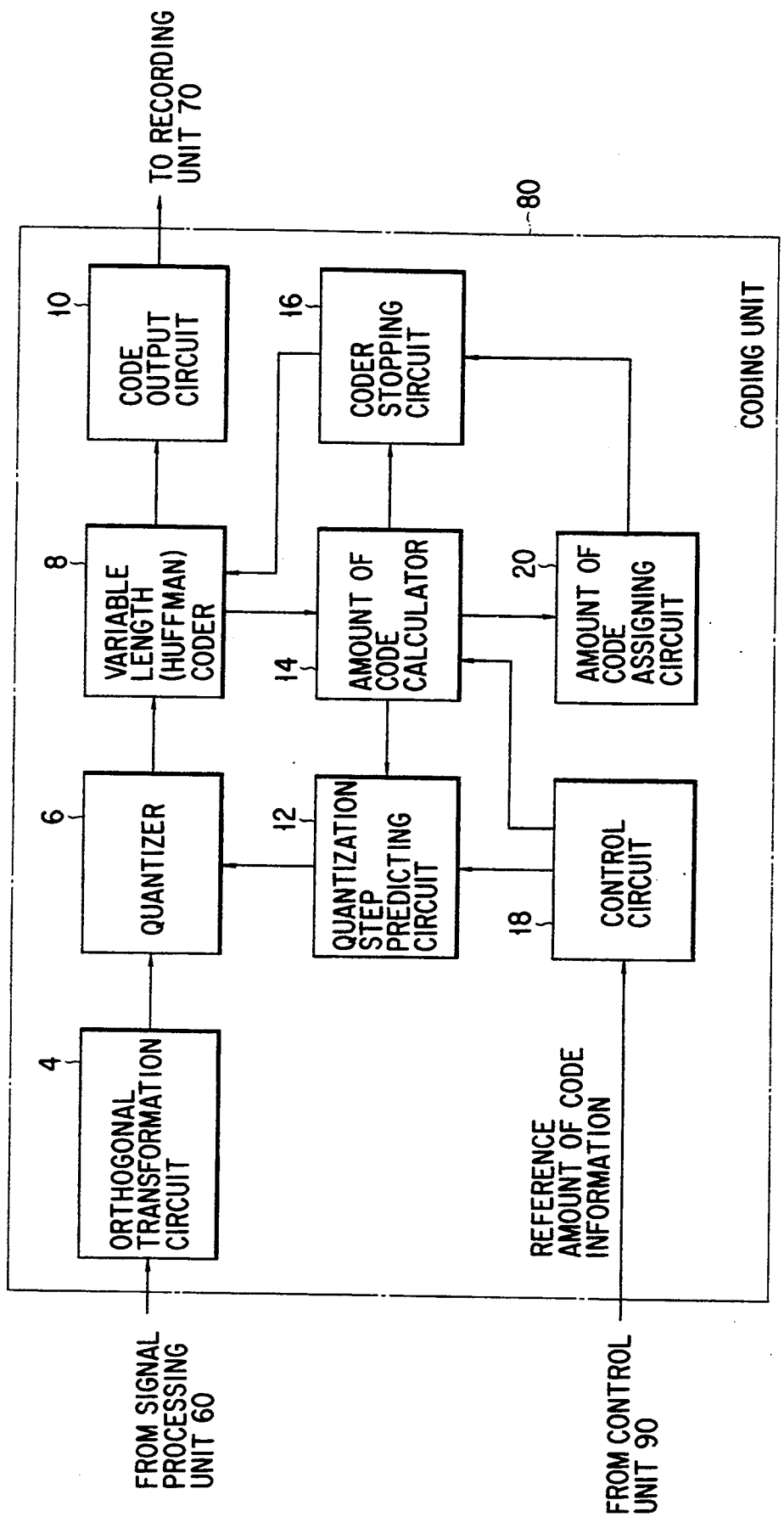
F I G. 3

IMAGE DATA COMPRESSING/CODING APPARATUS

Background of the Invention

1. Field of the Invention

The present invention relates to an apparatus and a method for compressing and coding image data wherein the amount of code data is compressed within a predetermined level.

2. Description of the Related Art

Recently, an image signal is stored or recorded as digital data in a memory card in which a semiconductor memory is contained in a card-shaped housing, a hard disk, or a floppy disk. Since any of the above storage devices has a limit in its memory capacity and the image signal includes a large amount of data, it is necessary to use a coding system with a high compression rate when the image data of many frames is stored in the storage device with the limited capacity.

An example of the image recording device is a digital electronic still camera which is entirely different in principle from a conventional camera. A solid-state imaging device such as a CCD (Charge Coupled Device) area sensor is used for imaging an object. The image of the object obtained by the solid-stage imaging device is converted into digital data and the digital data is stored in the recording medium. As the recording medium, the memory card, the hard disk, the floppy disk, or the magnetic tape has been employed. Thereafter, the digital data stored in the recording medium is read out. The readout image data is displayed on a monitoring unit such as a CRT display or recorded on a paper by means of a video printer.

In the digital electronic still camera as described above, the number of images to be recorded in a memory card, a magnetic disk, or a magnetic tape cassette is predetermined, and it is necessary to store the number of images not smaller than the predetermined number in the recording medium. Further, it is necessary to shorten a time required to record the image including a time to process the image data and a time to reproduce the recorded image data, and it is necessary to make these times constant.

Another example of the image recording device is a digital video cassette recorder or a digital motion picture image filling apparatus which records a motion picture image. In this example, it is also necessary to record a predetermined number of image frames irrespective of the amount of image data per one frame.

More specifically, even in the case of a still picture or motion picture, it is necessary to reliably record the predetermined number of image frames and to make the time required to record and reproduce the image data short and constant.

Therefore, it is necessary to compress the image data so that the amount of data per one frame falls within a specified level.

As an example of a high efficiency image data compression system capable of satisfying the above requirements, there is a well known method of coding which has in combination an orthogonal transformation coding and a variable length coding. There is a JPEG (Joint Photographic Experts Group) system which is proposed as an international standard system.

The JPEG system will be briefly described.

First, two dimensional image data of one frame is divided into a plurality of blocks of a predetermined size, e.g., 8×8 pixels. The image data for each block is subjected to an orthogonal transformation, e.g., two dimensional DCT (Discrete Cosine Transformation). When the image data is subjected to the orthogonal transformation, the image data is transformed into sixty-four DCT coefficients corresponding to the frequency components.

Secondly, the sixty-four DCT coefficients are linearly quantized using quantization steps corresponding to the frequency components. The quantized coefficients are subjected to a variable length coding, e.g., a Huffman coding. The variable length coding is also called an entropy coding. The coding procedure for the AC components differs from that for the DC component.

For the DC component, a differential value with respect to the DC component of the block previously coded is divided into groups in accordance with a predetermined table. Due to this grouping, the DC component is divided into a group number (serial number) and an additional bit representing the value of the DC component in the group (the number of bits of the additional bit being equal to the group number). The group number is subjected to coding using a one dimensional Huffman coding table. The additional bit is so added to the Huffman code of the group number so that the additional bit follows the Huffman code.

For the AC component, the AC components are scanned from low to high frequency components which is called "a zigzag scanning", and aligned in a one dimensional array. It is determined whether or not each component is zero (invalid). The length of the invalid coefficients (components) is counted as a run length. Valid coefficients other than zero are divided into groups in accordance with a predetermined table. Due to this grouping, the AC components are divided into a group number (serial number) and an additional bit representing the value of the AC component in the group (the number of bits of the additional bit being equal to the group number). The run length and a group number of the AC component which is located behind the continuous invalid coefficients are subjected to coding using a two dimensional Huffman coding table. The Huffman code and the additional bit are output for each valid AC component.

The foregoing description is the fundamental portion of this system and will be described with reference to FIG. 1.

As shown in the portion (a) of FIG. 1, image data (digital data) of one frame (the image of one frame proposed in the JPEG standard is 720×576 pixels) is divided into blocks of a predetermined size (e.g., blocks A, B, C . . . of 8×8 pixels). For the color image, plural color components are required. In this example, a luminance component (Y) signal, a first color difference (R-Y: hereinafter called as chroma-red) component signal, and a second color difference (B-Y: hereinafter called as chroma-blue) component signal are used. Therefore, the signal processing after the blocking is performed for the respective color components.

As shown in the portion (b), the respective divided blocks are subjected to a two dimensional DCT as an orthogonal transformation, and the results of DCT (DCT coefficients) are sequentially stored in a matrix (memory) of 8×8. When the image data is considered in a two dimensional plane, it has a spatial frequency representing a frequency information based on the distribution of a density of pixels. Therefore, the image data is transformed into DCT coefficients for the respective frequency components including the DC component and AC components. In the matrix of 8×8, data representing the DC component of the DCT coefficient is stored at an origin (0, 0) position, data representing the maximum frequency of the AC component with respect to an abscissa is stored at (0, 7) position, data representing the maximum frequency of the AC component with respect to an ordinate is stored at (7, 0) position, and data representing the maximum frequency of the AC component with respect to the oblique direction is stored at (7, 7) position. Data stored in other positions represent frequencies which are sequentially increased from the origin position to the (7, 7) position.

The stored data of the respective coordinate positions in this matrix are divided by the quantization steps corresponding to the respective frequency components to be linearly quantized as shown in the portion (c). Thereafter, the quantized value is subjected to the Huffman coding as a variable length coding. At this time, the quantization steps for the respective color components are predetermined as quantization step matrices.

A differential value of the DC component with respect to the DC component of the previous block is represented by a combination of the group number (the number of the additional bit) and the additional bit. The group number is subjected to the Huffman coding. The code word of the group number and the additional bit form code data (d1, e1).

With respect to the AC component, the valid (non-zero) component is represented by a combination of the group number and the additional bit. Therefore, the DCT coefficient matrix is scanned from low to high frequency components under a so-called "zigzag scanning" method. The number of the continuous invalid (zero) coefficients (zero run length) and the group number of the valid coefficient succeeding the continuous invalid coefficients are subjected to a two dimensional Huffman coding. The code word obtained by the Huffman coding and the additional bit are added to form code data (d2, e2).

In the Huffman coding, the number of bits assigned to each frequency component is determined such that the number of bits of the components nearer a center is reduced and the number of bits of the components further from the center is increased where the frequency component in one frame image having a maximum generation frequency is regarded as the center.

The foregoing description relates to the fundamental portion of this system.

However, the amount of code data obtained by the fundamental portion of this system is not constant for the respective images since the Huffman coding of the variable length coding is employed. Therefore, the number of images stored in the memory card also becomes variable. In order to prevent the variation of the number of images stored in the memory card, it is necessary to control the amount of code data. As its method, the following system has been proposed.

The above described fundamental portion is processed while a quantization step coefficient a is provisionally determined and is multiplied with a quantization step matrix which is a similar matrix of 8×8 as the coefficient matrix in order to obtain the quantization steps for the respective frequency components as shown in the portion (g) in FIG. 1. At the same time, the total amount of code data (total number of bits of code data) for all the block in one image is calculated.

As shown in the portion (h) in FIG. 1, an optimum quantization step is determined by using equation (1) (described later) in accordance with the calculated total amount of code data, a reference amount of code data which is an upper limit of the total amount of code data, and the provisional quantization step coefficient $\alpha$.

Then, the process following the quantization of the above-described fundamental portion is repeated by using the optimum quantization step coefficient. An optimum quantization step coefficient for approximating the total amount of code data to the reference amount of code data is predicted in accordance with the total amount of code data generated in the present cycle, the total amount of code data generated in the previous cycle, the reference amount of code data, the optimum quantization step coefficient used in the present cycle, and the optimum quantization step coefficient used in the previous cycle.

If the predicted quantization step coefficient is sufficiently approximated to the quantization step coefficient of the previous cycle and the total amount of code data generated in the present cycle is smaller than the reference amount of code data, the process is ended, and the code data generated in the present cycle is stored in a recording medium, such as the memory card, as shown in the portion (f) in FIG. 1. If not, a new quantization step coefficient is again predicted, and the above-described process is repeated by using the predicted new quantization step coefficient.

However, the time required for processing a signal according to the above procedure is variable since the number of times of repeating the fundamental portion is dependent on the type of the image. Further, the processing time according to the above procedure is relatively long. In order to overcome these drawbacks and to suppress the total amount of code data within the predetermined level, there is a system formed by combining the orthogonal transformation and the variable length coding described in U.S. application Ser. No. 07/602,162 by the assignee of the present invention (filed on Oct. 23, 1990 and allowed on Jul. 1, 1991, now U.S. Pat. No. 5,073,820).

In this prior art, in order to suppress the total amount of code data within the predetermined level, the image stored in the memory is divided into blocks and the image data of each block is subjected to the orthogonal transformation. The transformed output is quantized by using the provisional quantization step coefficient $\alpha$. Then, the quantized output is subjected to the variable length coding, the amount of code data of the respective blocks and the total amount of code data of the entire image are calculated. A new quantization step coefficient $\alpha'$ for approximating the total amount of code data of the entire image to the reference amount of code data is then predicted based on the provisional quantization step coefficient, the total amount of code data of the entire image, and the reference amount of code data. The above process is hereinafter called a first pass (statistic process).

The image stored in the memory is again divided into blocks and the image data of each block is subjected to the orthogonal transformation. The transformed output is quantized by using the predicted quantization step coefficient $\alpha'$. Then, the quantized outputs are subjected to the variable length coding in the ascendant order of the frequency components. At the same time, the amount of code data assigned to each block is calculated based on the amount of code data of the respective blocks obtained in the first pass and the reference amount of code data. It is determined whether or not the amount of code data of each block is larger than the assigned amount of code data. If the amount of code data is larger than the assigned amount of code data, the variable length coding is stopped on the way, and the process of the next block is started. The process following the first pass is hereinafter called a second pass (coding process).

As described above, the amount of code data is controlled so that the total amount of code data of the image does not exceed the reference amount of code data. As described in the second pass, the coding of each block is interrupted according to the amount of code data of each block. Since the coding processing of the frequency components are in the ascendant order, the coding of the higher frequency components is omitted. The human being is very sensitive to the lower frequency component of the image data and is insensible to the higher frequency component. Therefore, the above process can suppress the amount of code data while keeping the decrease of the image quality at the minimum.

In summary, it has been requested that the image data can be compressed at a high rate in the application of the digital electric still camera and the like. The above international standard JPEG system can compress the code data at a high rate by using the combination of the orthogonal transformation for each block and the variable length coding. However, the JPEG system has a drawback that the amount of code data for each image is not constant due to the variable length coding. As a result, the number of the images stored in the recording medium such as a memory card, magnetic disk, or a magnetic tape cassette is variable.

In the field of image recording, the number of the images stored in the recording medium must be larger than the minimum number of the images which is predetermined. Further, it is necessary to shorten the signal processing time in the field of the camera since the power source of the camera is a battery and the shutter chance can not be lost.

The above U.S. patent application No. 602,162 (now U.S. Pat. No. 5,073,820) can compress the code data at a high rate and make the signal processing time constant by performing the first pass and the second pass only one time.

However, there may be a case for a special type of image in which the total amount of code data exceeds the reference amount of code data. The amount of code data assigned to each block is calculated based on the amount of code data of the respective blocks obtained in the first pass, the total amount of code data for the entire image, and the reference amount of code data (which is determined in order to enable the predetermined number of images stored in the recording medium). If the amount of code data is larger than the assigned amount of code data, the variable length coding is stopped in principle. However, the above application includes an exception that the coding of the DC component is not stopped even if the amount of code data is larger than the assigned amount of code data. The DC component can not be omitted since it is absolutely necessary to decode the coded image data. If the compression rate is high, the amount of code data of the DC component for a special type of image may become greatly larger than the assigned amount of code data in the last block of one image. Therefore, the total amount of code data generated in the second pass may exceed the reference amount of code data. Since the DC component is absolutely necessary to decode the coded image data, it is regarded as a failure of coding if the amount of code data of the DC component exceeds the reference amount of code data. The failure of coding is detected even if the amount of code data of the DC component for the last block exceeds the reference amount of code data even by one bit.

Further, since the digital electronic still camera includes a continuous shot function and the digital VCR receives many images in a short time interval, the coding must be completed in a short period of time without causing a failure of coding.

SUMMARY OF THE INVENTION

Accordingly, it is an object of the present invention to provide a simple apparatus for compressing and coding image data within a predetermined time such that the amount of code data is compressed within a predetermined level while keeping the decrease of the quality of image at the minimum.

In order to achieve the above object, an image data compressing and coding apparatus according to the present invention for dividing image data into blocks with a predetermined size, subjecting the image data of the block to an orthogonal transformation to obtain orthogonal transformation coefficients, quantizing the orthogonal transformation coefficients with quantizing means, and compressing and coding the quantized orthogonal transformation coefficients with variable length coding means, comprises means for calculating the amount of code data based on the output from the variable length coding means; control means for providing a reference amount of code data of the image data of one frame and sending forth a statistic process instruction and a coding process instruction after the completion of the statistic process; setting means for supplying to the quantizing means provisional quantization step data corresponding to the reference amount of code data supplied from the control means in the statistic process and the provisional quantization step data for a DC component of the orthogonal transformation coefficients and an optimum quantization step data for an AC component of the orthogonal transformation coefficients, the optimum quantization step data corresponding to a remainder amount of code data obtained by subtracting the amount of code data of the DC component which is quantized by using the provisional quantization step from the reference amount of code data set by the control means; means for calculating the amount of code data to be assigned to each block based on the amount of code data obtained in the statistic process and the reference amount of code data; and means for stopping the coding operation of the variable length coding means in the coding process when the amount of code data of a block exceeds the assigned amount of code data of the block, and wherein the quantizes means quantizing the orthogonal transformation coefficients in accordance with the quantization step data.

Another image data compressing and coding apparatus according to the present invention for dividing image data into blocks, subjecting the image data of the block to an orthogonal transformation to obtain orthogonal transformation coefficients, quantizing the orthogonal transformation coefficients with quantizing means in accordance with a provisional quantization step data, compressing and coding the quantized orthogonal transformation coefficients which are quantized with the variable length coding means in accordance with the provisional quantization step data, calculating the amount of code data, predicting an optimum quantization step data based on the amount of code data, dividing the image data into blocks, subjecting the block data to the orthogonal transformation to convert the image data to the transformation coefficients, quantizing the transformation coefficients with the quantizing means in accordance with the optimum quantization step data, compressing and coding the quantized transformation coefficients with the variable length coding means, and controlling the coding operation of the variable length coding means by controlling the amount of code data based on the amount of code data to be assigned to the block in accordance with the amount of code data of the block, comprises predicting means for predicting the optimum quantization step data for the transformation coefficients of the AC components and setting the provisional quantization step data for the transformation coefficient of the DC component as the optimum quantization step data; assigning means for predicting the amount of code data of the transformation coefficient of the AC components based on the predicted quantization step data and data obtained in the statistic process, setting the predicted amount of code data as the assigned amount of code data of the block, calculating the remainder of the amount of code data for the previous blocks, amending the assigned amount of code data for the block by adding the remainder thereto; and means for stopping the coding operation of the variable coding means for the transformation coefficients of the AC components of the block when the amount of code data of the block exceeds the assigned amount of code data of the block.

According to still another image data compressing and coding apparatus of the present invention which is a modification of the other image data compressing and coding apparatus of the present invention, the variable length coding means comprises first coding means for differentiating the transformation coefficients of the DC component for a block with respect to the transformation coefficients of the previous block and subjecting the differential value to the variable length coding and second coding means for subjecting the transformation coefficients of the AC components after the coding of the DC component, and the coding operation stopping means comprises means for stopping the operation of the second coding means.

An image data compressing and coding method according to the present invention for dividing the image data into blocks with a predetermined size, subjecting the image data of the block to an orthogonal transformation to convert the image data to transformation coefficients for respective frequency components, quantizing the transformation coefficients with quantizing means, and compressing and coding the quantized transformation coefficients with variable length coding means, comprises a statistic step; and a coding step which is executed after the statistic step, the statistic process comprising the substeps of quantizing the transformation coefficients in accordance with predetermined provisional quantization step data, calculating the amount of code data of the variable length code of the quantized transformation coefficients quantized in accordance with the provisional quantization step data, predicting an optimum quantization step data for the transformation coefficients of the AC components based on the amount of code data of the variable length code and the reference amount of code data, determining the amount of code data to be assigned to the block, and setting the provisional quantization step data as the optimum quantization step data for the transformation coefficient of the DC component, and the coding process comprising the substeps of quantizing the transformation coefficients in accordance with the optimum quantization step data, calculating the amount of code data of the variable length code of the quantized transformation coefficients quantized in accordance with the optimum quantization step data, and controlling the output of the variable length code such that the amount of code data of the block does not exceed the assigned amount of code data.

Another image data compressing and coding method according to the present invention for dividing the image data into blocks, subjecting the block data to the orthogonal transformation to convert the image data to transformation coefficients, quantizing the transformation coefficients by quantizing means in accordance with provisional quantization step data, compressing and coding the quantized transformation coefficients with variable length coding means, calculating the amount of code data, predicting an optimum quantization step data based on the amount of code data, dividing the image data into blocks, subjecting the block data to the orthogonal transformation to convert the image data to transformation coefficients, quantizing the transformation coefficients with the quantizing means in accordance with the optimum quantization step data, compressing and coding the quantized transformation coefficients with the variable length coding means, and controlling the coding operation of the variable length coding means by controlling the amount of code data based on the amount of code data to be assigned to the block in accordance with the amount of code data of the block, comprises a first step of performing the quantizing and coding in accordance with the provisional quantization step data and calculating the amount of code data of the entire image data and the amount of code data of the transformation coefficients of the AC components; a second step of predicting the optimum quantization step data for the transformation coefficients of the AC components based on the amount of code data of the entire image and setting the provisional quantization step data as the optimum quantization step data for the transformation coefficient of the DC components; a third step of quantizing the transformation coefficients in accordance with the optimum quantization step data; and a fourth step of calculating the amount of code data of the AC components to be assigned to the block based on the amount of code data of the AC components of the block and the predicted quantization step data and performing the variable length coding such that the amount of code data of the block does not exceed the sum of the amount of code data assigned to the block and the amount of code data of the remainder of the previous blocks.

In the present invention configured as described above, the image data is divided into blocks, the divided blocks are sequentially subjected to the orthogonal transformation to obtain transformation coefficients for the respective frequency components, the orthogonal transformation coefficients of the respective frequency components are quantized in the ascendant order by the quantizing means, and the quantized values are subjected to the variable length coding. The control means sends forth the statistic process (first pass) instruction and then the coding (second pass) instruction. In the statistic process, the setting means supplies the predetermined provisional quantization step corresponding to the reference amount of code data supplied from the control means to the quantizing means. The quantizing means quantizes the orthogonal transformation coefficients of the block using the provisional quantization step and the variable length coding means codes the quantized value, thereby calculating the amount of code data. The amount of code data to be assigned to the block is determined by the assigning means based on the amount of code data of the block, the amount of code data for the entire image, and the remainder of the amount of code data obtained by subtracting the amount of code data of the DC component from the reference amount of code data. The setting means sets the provisional quantization step as the optimum quantization step for quantizing the DC component of the transformation coefficients and predicted quantization step which is obtained based on the remainder of the amount of code data as the optimum quantization step for quantizing the AC component of the transformation coefficient. The optimum quantization step is supplied to the quantizing means. The coding operation for a block by the variable coding means is stopped when the amount of code data of the block exceeds the assigned amount of code data in the coding process.

Since the amount of code data of the DC component obtained in the statistic process does not vary in the coding process, the remainder amount of code data obtained by subtracting the amount of code data of the DC component from the reference amount of code data is assigned to the AC components, an optimum quantization step for the AC components is predicted within the remainder amount of code data, and the quantization and variable length coding are performed by using the predicted optimum quantization step, it is possible to compress the amount of code data within the predetermined level for all the types of image data. Further, there is no trial and error procedure required for coding. Therefore, the coding is completed in a short time.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a block diagram showing a configuration example of a coding unit which is a main portion of the present embodiment;

DETAILED DESCRIPTION OF THE PREFERRED EMBODIMENTS

Figure 1:
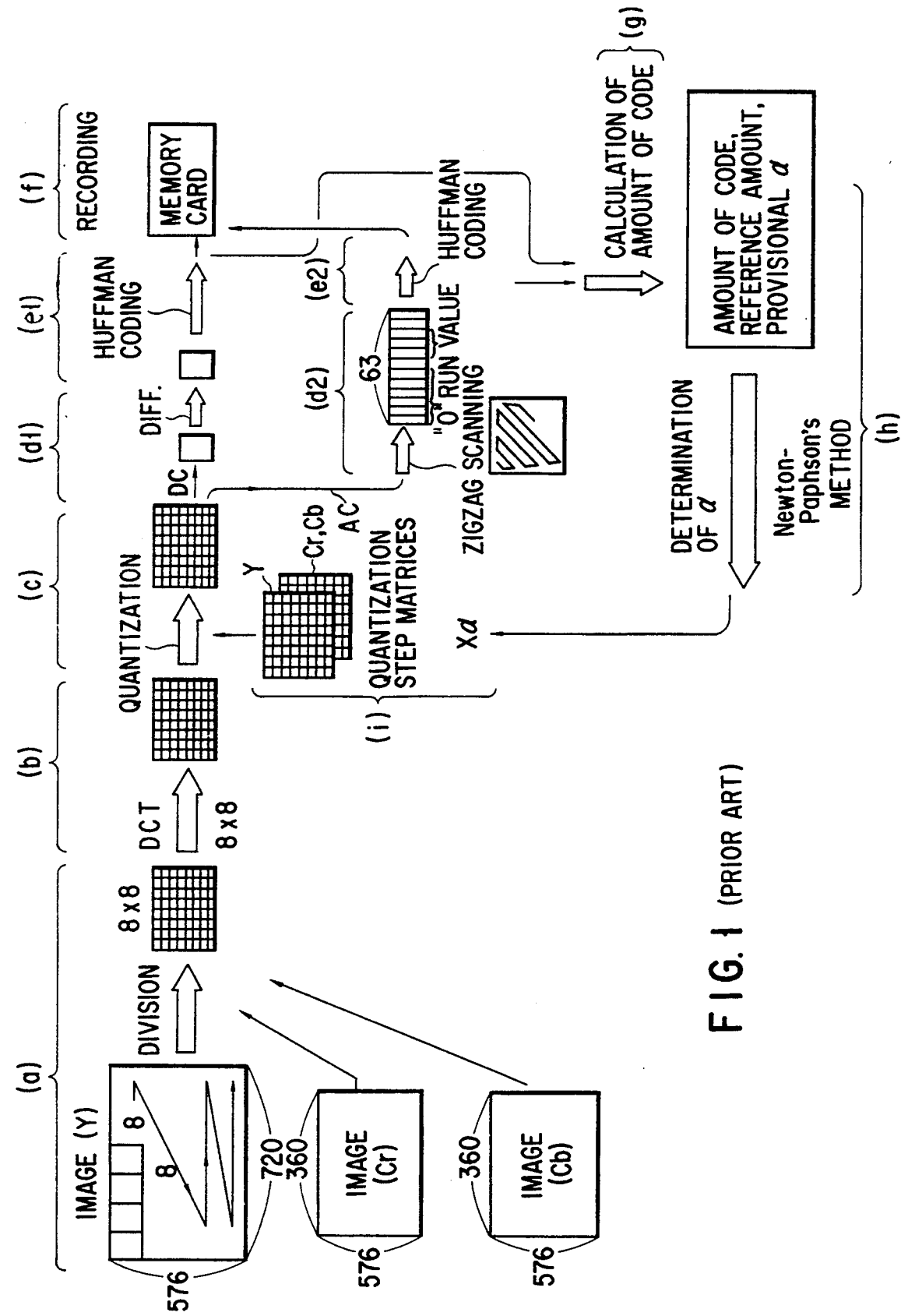
FIG. 1 is a block diagram showing a conventional image data compressing/coding apparatus.

A preferred embodiment of an image data compressing/coding apparatus according to the present invention will now be described with reference to the accompanying drawings.

The fundamental concept of the present invention will be first described so as to readily understand the present invention.

In the present invention, the statistic process is performed for the image data by using the provisional quantization step coefficient in order to predict an optimum quantization step coefficient for the AC components. Thus, statistical data is obtained which is necessary for determining the amount of code data of the AC components assigned to each block.

After the prediction of the optimum quantization step coefficient and the determination of the amount of code data of the AC components assigned to each block, the actual coding (second pass) is started.

In the actual coding, the AC component is quantized by using the predicted quantization step coefficient and the DC component is quantized by using the provisional quantization step coefficient. All the DC components are coded without regarding the assigned amount of code data and the coding of the AC components is proceeded while monitoring the amount of code data for the AC component obtained by the variable length coding so that the amount of code data falls within the assigned amount of code data of the block which is a sum of the assigned amount of code data of the block and the amount of code data which remains in the previous block. When the amount of code data reaches the assigned amount of code data, the coding of the block is ended.

The remainder of the amount of code data is stored and the coding of the next block is started.

In the statistical operation, the optimum quantization step coefficient for the AC components is predicted and the statistical data is obtained which is necessary for determining the amount of code data of the AC components assigned to each block.

For the DC component, the quantization step coefficient is not changed during the statistical operation and the actual coding operation. Stated another way, the same quantization step coefficient is used for both the statistical operation and the actual coding operation. Therefore, the amount of code data of the DC component obtained in the statistical operation is also applied to that in the actual coding operation. Further, since the amount of an EOB (End Of Block) data is constant without regarding the quantization step coefficient, the amount of code data of the AC component assigned to the block is obtained by subtracting the amount of code data of the DC component and the EOB from the reference amount of code data.

Since the optimum quantization step coefficient is used in the coding operation, the amount of code data of the AC components generated in the coding operation substantially becomes the assigned amount of code data of the AC components. However, it is to be noted that not only one byte but also even one bit of the code data of the AC components generated in the coding operation cannot exceeds the assigned amount of code data.

Therefore, the amount of code data of the AC components assigned to each block is controlled according to the present invention. This control can finely adjust the amount of code data when the amount of code data of the AC components generated in the coding operation exceeds the assigned amount of code data of the AC components.

The frequency components of the image data of the respective blocks are sequentially coded in the ascendant order. When the amount of code data generated in the coding operation exceeds the reference amount of code data, the coding operation for that block and blocks having higher frequency components is cut off. Therefore, the coding of the higher frequency components which does not affect the quality of image is omitted. If the amount of code data of the block is not larger than the assigned amount of code data, the coding of the block is completed and the EOB code is output. The remainder of the amount of code which is a difference between the assigned amount of code data and the generated amount of code data is added to the assigned amount of code data of the next block to correct the assigned amount of code data of the next block. When the generated amount of code data exceeds the assigned amount of code data during the coding procedure of one block, the coding of the block is interrupted and the remainder of the amount of code is added to the assigned amount of code data of the next block.

As described above, the DC component which is most important is always coded and the coding of the AC components having a higher frequency is cut off in accordance with the amount of code data generated. Therefore, it is prevented that the amount of code data of the AC component generated in the coding operation exceeds the assigned amount of code data of the AC component for each block. As a result, the total amount of code data can be suppressed within the reference amount of code data.

According to the present invention, the coding is always performed with two passes (statistic operation and actual coding operation) and the amount of code data within the block is adjusted by only controlling the coding of the AC components. Therefore, the image data can be coded with a simple construction and within a predetermined time such that the amount of code data falls within a predetermined amount while keeping the decrease of the image quality at the minimum.

Figure 2:
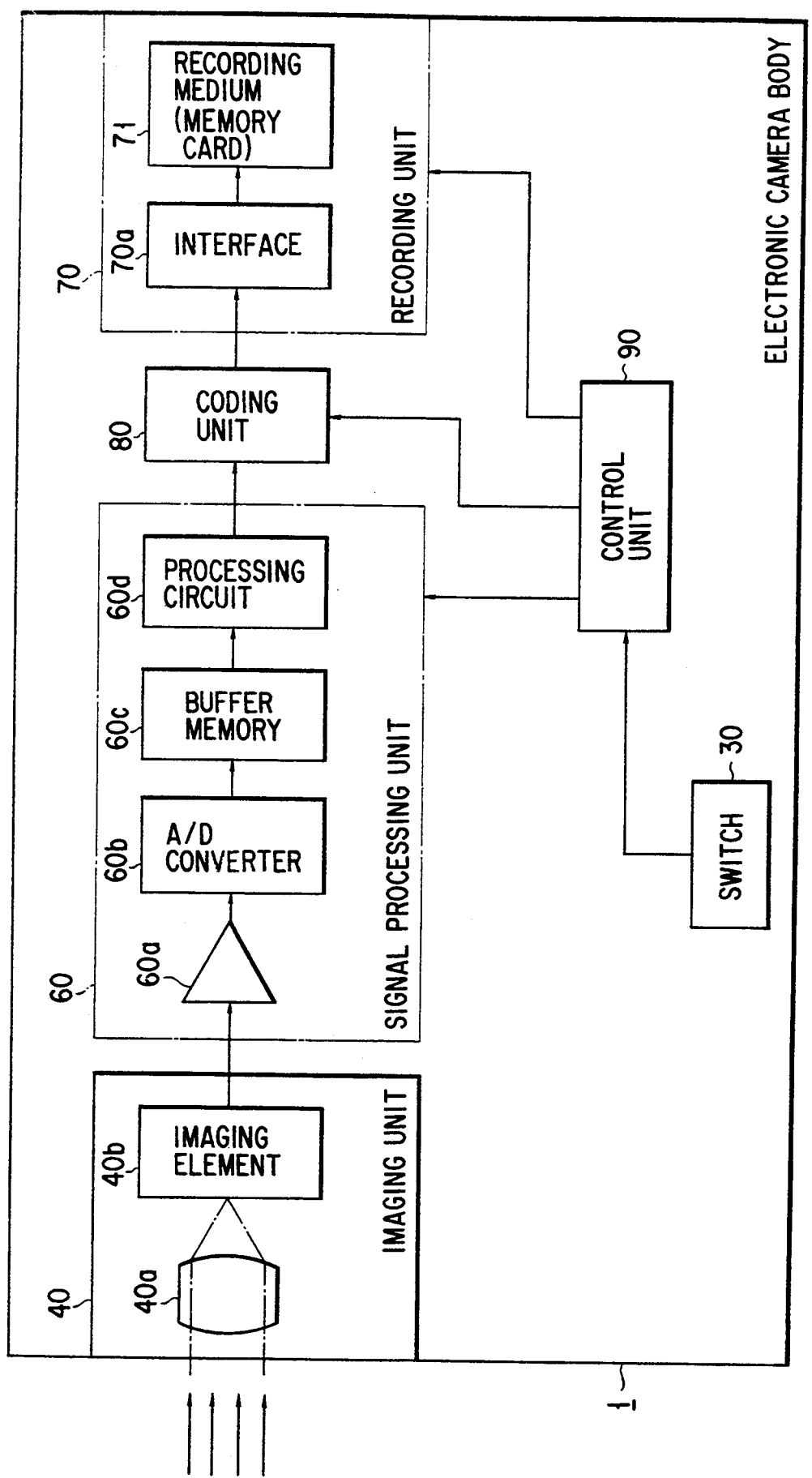
FIG. 2 is a block diagram showing an embodiment of an image data compressing/coding apparatus according to the present invention.

FIG. 2 is a block diagram of an embodiment of an image data compressing/coding apparatus according to the present invention which is applied to a digital electronic still camera, and FIG. 3 is a block diagram of a coding unit 80 of the digital electronic still camera of FIG. 2. The mechanism of the digital electronic still camera which is not directly related to the present invention is not illustrated and the description thereof will be omitted.

As shown in FIG. 2, a digital electronic still camera (hereinafter referred to as an electronic camera body) 1 comprises an imaging unit 40 for imaging an object to produce an image signal, a signal processing unit 60 for processing the output of the imaging unit 40, a coding unit 80 having functions of orthogonal transformation, linear quantization, and variable length coding for compressing and coding the output of the signal processing unit 60, a recording unit 70 for recording the coded image data output from the coding unit 80 and a quantization step (or coefficient data corresponding thereto) on a recording medium 71, a switch 30 for setting and inputting data including desired compression rate, and a control unit (microprocessor) 90 for controlling the entire system.

The switch 30 for setting the compression rate etc. is provided in the operation panel portion of the electronic camera body 1 and connected to the control unit 90.

The imaging unit 40 has a lens 40a for focusing an optical image of the object, and an imaging element 40b such as a CCD (Charge Coupled Device). The imaging element may be replaced with an image pick-up tube. The signal processing unit 60 has an amplifier 60a for amplifying and removing noise, an A/D converter 60b for converting an analog signal into a digital signal, a buffer memory 60c formed of, for example, a RAM (Random ACCess Memory), and a processing circuit 60d for forming a color signal.

As shown in FIG. 3, the coding unit 80 has an orthogonal transformation circuit (for example, a discrete cosine transformation circuit) 4 for orthogonally transforming the image signal, a quantizer 6 for linearly quantizing the output of the DCT circuit 4, and a variable length coder (for example, a Huffman coder) 8 for Huffman-coding the quantized signal. The coding unit 80 further comprises a quantization step predicting circuit 12, an amount of code data calculator 14, an amount of code data assigning circuit 20, a coder stopping circuit 16, and a control circuit (microprocessor) 18 for controlling the entire system of the coding unit 80.

With reference to FIG. 2, the recording unit 70 has an interface 70a and a recording medium (for example, a memory card) 71 containing an IC memory. The memory card 71 is detachably mounted in the electronic camera body 1.

Figures 7, 8:
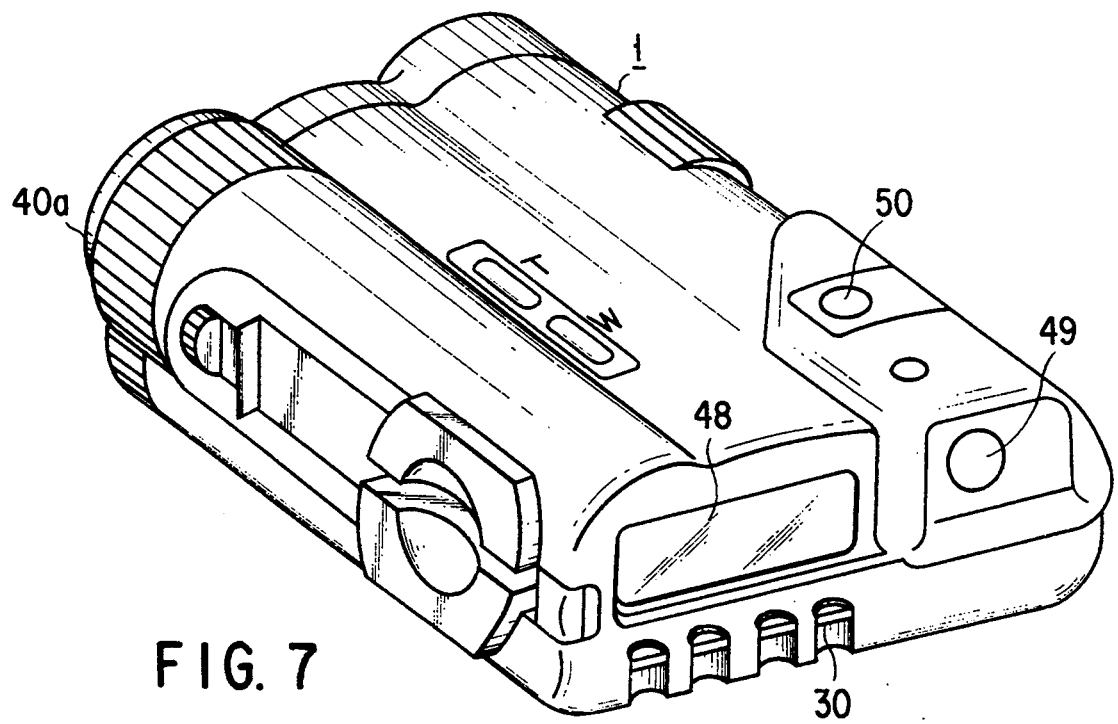
FIG. 7 is a perspective view showing the external appearance of a digital electronic still camera according to the present invention.
FIG. 8 illustrates a zigzag scanning of DCT coefficients for each block of 8 x 8 matrix.

FIG. 7 is a perspective view of the external appearance of the electronic camera body 1. FIG. 7 shows a binocular type body. As shown in FIG. 7, the electronic camera body 1 has an LCD (Liquid Crystal Device) display unit 48 in the operating panel, the switch 30, a telescopic/wide switch, a shutter release button 50, a finder 49, etc. The LCD display unit 48 displays various values or states such as a photographing mode, the number of frames, a date, a time, various numerals under the control of the control unit 90.

In the present electronic camera, the compression rate of the image can be set to a desired value by operating the switch 30 provided in the operating panel of the electronic camera 1. More specifically, a plurality of predetermined compression rates are set in the control unit 90 of the electronic camera 1, and the control unit 90 obtains a suitable compression rate based on the photographing frame number which is set by the operation of the switch 30 and the memory capacity of the recording medium 71 mounted to the camera 1, and displays them on the LCD display unit 48 of the operating panel of the electronic camera 1. When the switch 30 is depressed by a user, the control unit 90 alters the compression rate each time when the switch 30 is pressed.

The user stops pressing of the switch 30 when a desired compression rate or photographing frame number is displayed while observing the value displayed on the display unit 48. Then, the control unit 90 sets the compression rate corresponding to the designated value of the photographing frame number to be imaged at that time point. In this case, the control unit 90 obtains the reference amount of code data for one image by subtracting an amount of data for a portion other than code, such as a header, and an amount of EOB data from the total amount of code data obtained in accordance with the compression rate and supplies the reference amount to the coding unit 80.

When a shutter release button 50 as a trigger switch is depressed, a shutter operation of the camera is started, and an image to be photographed is focused on the imaging element 40b. Since electric charges are stored corresponding to the image on the imaging unit 40, an image signal is obtained from the imaging element 40b by controlling the imaging element 40b to read out the charges therefrom. These controls are performed by the control unit 90.

The imaging unit 40 in FIG. 2 has an imaging lens 40a, and an imaging element 40b formed of a solid-state imaging device such as a CCD, converts an optical image focused on the imaging element 40b by the imaging lens 40a into an image signal, and outputs the image signal to the signal processing unit 60.

The signal processing unit 60 has an amplifier 60a, an A/D converter 60b, a buffer memory 60c, and a processing circuit 60d. The image signal obtained by the imaging element 40b is separated into color components of Y (luminance), R-Y (chroma-red (Cr) color difference), B-Y (chroma-blue (Cb) color difference) by the processing circuit 60d, and subjected to a gamma correction or a white balancing process, etc. The color component separation is not limited to the above colors. The image signal can be separated into other color components.

The output image signal of the imaging unit 40 is converted into a digital signal by the A/D converter 60b and the digital signal is temporarily stored as image data in the buffer memory 60c having, for example, a capacity of one frame. The image data is read out from the buffer memory 60c, supplied to the processing circuit 60d, and separated into the Y component of luminance signal and the Cr and Cb signals of chrominance signals.

The Y component data of the image signal stored in the buffer memory 60c is first obtained by the processing circuit 60d to be subjected to the statistical operation first. The Y component data of the image signal is first coded. When the coding of the Y component is ended, the data of the Cr and Cb components are processed and then coded. However, the order of the processing of the three color components is not limited to the above order and can be changed freely.

The signal processing unit 60 has a function of dividing one frame (or filed) of image components Y, Cr, and Cb into a plurality of blocks, which is obtained by processing the image data read out from the buffer memory 60c by the processing circuit 60d. The blocking process is performed by dividing the image data stored in the buffer memory 60c for a predetermined number of pixels in both the x and y directions and reading out the image data for each division. For example, the image data is divided into $8 \times 8$ pixels. However, the block size of the present invention is not limited to this example. The block sizes may be different in the luminance signal Y and the chrominance signal C.

In the present embodiment, the data of the luminance signal Y is read out, divided into blocks, supplied to the processing circuit 60d of the following stage, and the Y component data is statistically processed. When the statistic process is completed, the data of the chrominance signals Cr and Cb are read out to be statistically processed. The chrominance signal Cr is first divided into blocks for all the image data. Then, the chrominance signal Cb is divided into blocks.

The coding unit 80 has a configuration as shown in FIG. 3. As shown in FIG. 3, the coding unit 80 has an orthogonal transformation circuit 4, a quantizer 6, a variable length coder 8, a code output circuit 10, a quantization step predicting circuit 12, an amount of code data calculator 14, a coder stopping unit 16, a control circuit 18, and an amount of code data assigning circuit 20.

The orthogonal transformation circuit 4 receives the image data divided into blocks and performs two dimensional orthogonal transformation for the respective blocks of the image data. As the orthogonal transformation, a cosine transformation, a sine transformation, a Fourier transformation, or a Hadamard transformation can be used. Image data is converted into transformation coefficients by means of the orthogonal transformation.

The quantizer 6, when receiving the transformation coefficients output from the orthogonal transformation circuit 4, quantizes them as follows.

In the first quantization (at the time of statistic process), a preset quantization step for each frequency component is multiplied by a quantization step coefficient $a$ determined based on a photographing mode (the compression rate or the number of photographing images) to obtain a provisional quantization step. The transformation coefficients are quantized by using the provisional quantization step. In the second quantization (at the time of coding process), a preset quantization step for each AC component is multiplied by an optimum quantization step coefficient $a$ determined based on an amount of code data obtained in the statistic process to obtain the quantization step for the AC component. The transformation coefficient of the DC component is quantized by using the provisional quantization step as used in the statistic process.

The variable length coder 8 performs a variable length coding (entropy coding) operation with respect to the quantized output from the quantizer 6. As the variable length coding, a Huffman coding, or an arithmetic coding is used. When the image is subjected to the variable length coding, the amount of code data varies for every block and frame. Though it is not directly relevant to the present invention what kind of variable length coding is used, an example of using the Huffman coding will be described.

The variable length coder 8 scans the transformation coefficients quantized and input thereto from low to high frequency components by a method called "a zig-zag scanning" for scanning in the sequence shown in FIG. 8. After the zigzag scanning, the matrix of the transformation coefficients is converted into a one dimensional array of transformation coefficients.

The data of a first DC component of the scanning sequence of FIG. 8 is subjected to the differential processing and a difference between the DC component of the block and that of the preceding block is calculated. This difference is grouped in accordance with a predetermined table. Due to this grouping, the DC component is divided into a group number (serial number) and an additional bit representing the value of the DC component in the group (the number of bits of the additional bit being equal to the group number). The group number is subjected to coding using a one dimensional Huffman coding table. The additional bit is so added to the Huffman code of the group number that the additional bit follows the Huffman code.

As to the AC components, transformation coefficients are sequentially checked from the second to the sixty-fourth of the scanning sequence of FIG. 8. When the non-zero (valid) coefficient is detected, the length (run length) of the zero (invalid) coefficients and the value of the non-zero coefficient are subjected to the two dimensional Huffman coding. That is, it is determined whether or not the coefficient is zero and the number of the continuous zero coefficients is counted as the run length. The non-zero (valid) coefficient is divided into groups in accordance with a predetermined table. Due to this grouping, the valid AC components are divided into a group number (serial number) and an additional bit representing the value of the AC component in the group (the number of bits of the additional bit being equal to the group number). The run length of the invalid coefficients and a group number of the AC component which follows the continuous invalid coefficients are subjected to coding using a two dimensional Huffman coding table. The Huffman code and the additional bit are output for each valid AC component.

When the invalid coefficients are continued continuously from a given coefficient up to sixth-fourth coefficient, the code of EOB indicating the end of the block is output. When a coder stop signal of a command for stopping the coding is input, the coding is ended and the EOB is added to the code which is already generated.

Then, the amount of code data for the respective frequency components generated at each block is output to the amount of code data calculator 14.

The amount of code data calculator 14 accumulates the amount of code data of the input Y, Cr, and Cb components for each block and obtains a reference amount of code data of the AC components (which can be used for the code of the AC components) by subtracting the amount of code data of the DC component and the amount of the EOB data from the reference amount of the code data of the entire image supplied from the control circuit 18. The amount of code data calculator 14 supplies data representing the amount of code data of the entire image and the reference amount of code data of the AC components to the quantization step predicting circuit 12. The amount of code data calculator 14 supplies data representing the amount of code data of the AC components of the entire image and the respective blocks and the reference amount of code data of the AC components to the amount of code data assigning circuit 20. The amount of code data calculator 14 supplies data representing the result of accumulation of the amount of code of the AC components of Y, Cr, and Cb components to the coder stopping circuit 16.

The quantization step predicting circuit 12 receives the data representing the reference amount of code data from the control circuit 18 upon the start of the statistical process and predicts the initial value of the quantization step coefficient a based on the reference amount of code data by using a linear equation (1) described later. The predicted initial value of the quantization step coefficient is supplied to the quantizer 6. At the start of the coding process, the quantization step predicting circuit 12 predicts an optimum quantization step coefficient a which is suitable for approximating the total amount of code data to the reference amount of code data, based on the amount of code data of the AC components of the entire image supplied from the amount of code data calculator 14, the reference amount of code data of the AC component (the difference obtained by subtracting the amount of code data of the DC component and the EOB from the reference amount of the code data), and the provisional quantization step coefficient by using the linear equation (1). This prediction is a linear prediction.

The amount of code assigning circuit 20 calculates the amount of code data of the AC components assigned to each block based on the amount of code data of the AC components for each block, the amount of code data of the AC components for the entire image, and the reference amount of code data of the AC components and supplies the assigned amount of code data to the coder stopping circuit 16.

The reference amount of code data of the AC components is divided to the assigned amount of code data of the respective blocks in accordance with the ratio of the amount of code data of the AC components for the respective blocks. The assigned amount of code data of the AC components for a given block is determined by first multiplying the amount of the code data of the AC components for the given block with the reference amount of code data of the AC components and then dividing the product by the amount of code data of the AC components for the entire image. As a result, the amount of code data corresponding to the actual amount of code data is assigned to the block.

The amount of code assigning circuit 20 has the amount of code data table for storing the amount of code data of the AC components for the respective blocks supplied from the amount of code data calculator 14. The amount of code data of the AC components for the respective blocks are stored in a portion of the table corresponding to the block. The amount of code data assigning circuit 20 calculates the assigned amount of code data for the blocks based on the assigned amount of code data of the AC components for each block stored in the table, the amount of code data of the AC components for the entire image, and the reference amount of code data of the AC components.

The reference amount of code data assigned to a given block is calculated before the process of the data of the block is started and supplied to the coder stopping circuit 16.

The coder stopping circuit 16 subtracts the amount of code data of the AC components for the respective blocks from the assigned amount of code data for the block supplied from the amount of code data assigning circuit 20. The coder stopping circuit 16 outputs a coder stopping signal to cut off the coding operation if the remainder of the assigned amount of code data is smaller than the total amount of code data to be output.

On the other hand, the coder stopping circuit 16 does not cut off the coding if the remainder of the assigned amount of code data is not smaller than the total amount of code data to be output. When the coding for the block is completed, the coder stopping circuit 16 subtracts the total amount of code data to be output from the assigned amount of code data for the block. The remainder is added to the assigned amount of code data for the succeeding block.

The code output circuit 10 combines the codes of the variable lengths output from the variable length coder 8, and writes the combined codes in the recording unit 20 having a recording medium such as the memory card.

According to the present invention, the provisional quantization step coefficient a as the initial value determined in response to the photographing mode is first used to perform the statistical process (first pass). In the first pass, the amount of code data of the AC components for the blocks, the amount of code data of the DC component for the entire image, and the amount of code data of the AC components are calculated. The process (second pass) for optimizing the quantization step coefficient based on these data obtained in the first pass is started.

The operation flow of the present invention is summarized as follows:

"The image data is divided into blocks and the block data is subjected to the discrete cosine transformation";

"The DCT coefficients are quantized by using the provisional quantization step coefficient $\alpha$";

"The quantized DCT coefficients are subjected to a variable length coding";

"An optimum quantization step coefficient $\alpha$ for the AC components is predicted based on the amount of code data for the respective blocks and the total amount of code data of the DC and AC components of the entire image";

"The amount of code data assigned to the blocks is determined";

"The second pass process is started using the above information";

"The blocking process and the discrete cosine transformation in the second pass";

"The quantization process for the DC component by using the provisional quantization step coefficient and for the AC components by using the optimum quantization step coefficient";

"The variable length coding of the quantized DCT coefficient"; and

"Output process for storing the code data of the image".

The control circuit 18 in FIG. 3 controls the above series of processes. The control circuit 18 can be formed of a microprocessor.

The coding unit 80 is constituted as described above.

The recording unit 70 in FIG. 2 has the interface 70a and the recording medium 71 detachably connected to the interface 70a. The image data coded and output by the coding unit 80 and the quantization step coefficient (or data corresponding thereto) are recorded on the recording medium 71 through the interface 70a.

The operation of the embodiment 2 will be described. The fundamental operation of the embodiment will be first described in order to grasp the general concept of the entire apparatus with reference to FIG. 9 which is an operation transition view. To use the camera by a user, the switch 30 is operated to set a desired number of photographing images. Thus, the control unit 90 calculates the optimum amount of code data in accordance with the set number of photographing images, and supplies it as the reference amount of code data to the coding unit 80. Thus, the number of photographing images is set.

When the shutter is released, an optical image of the object is focused on the imaging element 40b placed at the rear of the imaging lens 40a. The imaging element 40b converts the focused optical image into an image signal, and outputs the image signal. The image signal obtained by the imaging element 40b is input to the signal processing unit 60. The image signal is amplified by the amplifier 60a in the signal processing unit 60, A/D-converted by the A/D converter 60b, and then temporarily stored in the buffer memory 60c. Thereafter, the image signal is read out from the buffer memory 60c, and processed to correct its band width and to form color signals by the processing circuit 60d in the signal processing unit 60.

The coding process at the later stage is sequentially executed in the order of signals Y (luminance) and Cr and Cb (chrominance), and the formation of the color signals is also executed in the same order. More specifically, the image signal is divided into blocks of a matrix of 8×8 and the image signal of the blocks are separated into the Y component, Cr component (R-Y component), and Cb component (B-Y component) in the processing circuit 60d. The processing circuit 60d also executes gamma correction and white balancing processes.

The image data of the respective color components obtained by dividing the image data into the matrix of 8×8 by the processing circuit 60d are input to the coding unit 80. As a result, the image data of one frame (or one field) is divided into blocks of the predetermined size, and sequentially input to the coding unit 80. It is noted that the image data of the color components divided into the blocks by the processing circuit 60d may be stored in the respective buffer memories according to the components of Y, Cr, and Cb, and read out to be used in the later process.

In this embodiment, the signal processing unit 60 processes the Y component (luminance component) of the image data of one frame, then divides the image data of the Cr component into blocks, after the image data of the Y component is statistically processed in the later stage. After the image data of the Cr component is statistically processed in the later stage, the image of the Cb component is then divided into blocks and statistically processed in the later stage.

The coding unit 80 supplies the input data received from the signal processing unit 60 to the orthogonal transformation circuit 4. Then, the orthogonal transformation circuit 4 performs two dimensional orthogonal transformation, for example, the two dimensional DCT for the input image data. The orthogonal transformation by the DCT corresponds to the division of the waveform of the image signal into the frequency components and the representation of the frequency components with cosine waves of different frequencies of the same number as the number of input samples.

The orthogonal transformed image data of the blocks (transformation coefficient matrix) is stored in the buffer memory (not shown) at the position (8×8 matrix) corresponding to the frequency component and the output from the buffer memory is input to the quantizer 6. The origin position (0, 0) of the matrix of the buffer memory corresponds to the DC component, and the other positions corresponding to the AC components in which the distance between the origin corresponds to the frequency.

The quantizer 6 quantizes the image data (transformation coefficient) of the block in the first pass. In the first quantization, the transformation coefficient is quantized by using the quantization step obtained by multiplying the quantized matrix for the frequency components (the frequency component is determined corresponding to the matrix positions of the block) by the provisional quantization step coefficient a which is determined by the control circuit 18 based on the number of photographing images set by the user (see the portions (h1) and (i) in FIG. 9).

It is noted that the quantized matrix of this case may be the same in both the luminance signal and the chrominance signal, but preferable results are obtained by setting suitable quantization matrices for the luminance signal and the chrominance signal.

The quantized block image data (transformation coefficients) are input to the variable length coder 8, and subjected to the variable length coding. In the variable length coder 8, the quantized transformation coefficients are scanned in a zigzag manner in the sequence as shown in FIG. 8, and scanned from low to high frequency components. In other words, the transformation coefficients are stored in the matrix of 8×8 at the positions corresponding to the frequency components. Since the frequency is lower nearer to the origin position, it can be scanned from low to high frequency components by scanning it in the zigzag manner.

Figure 9:
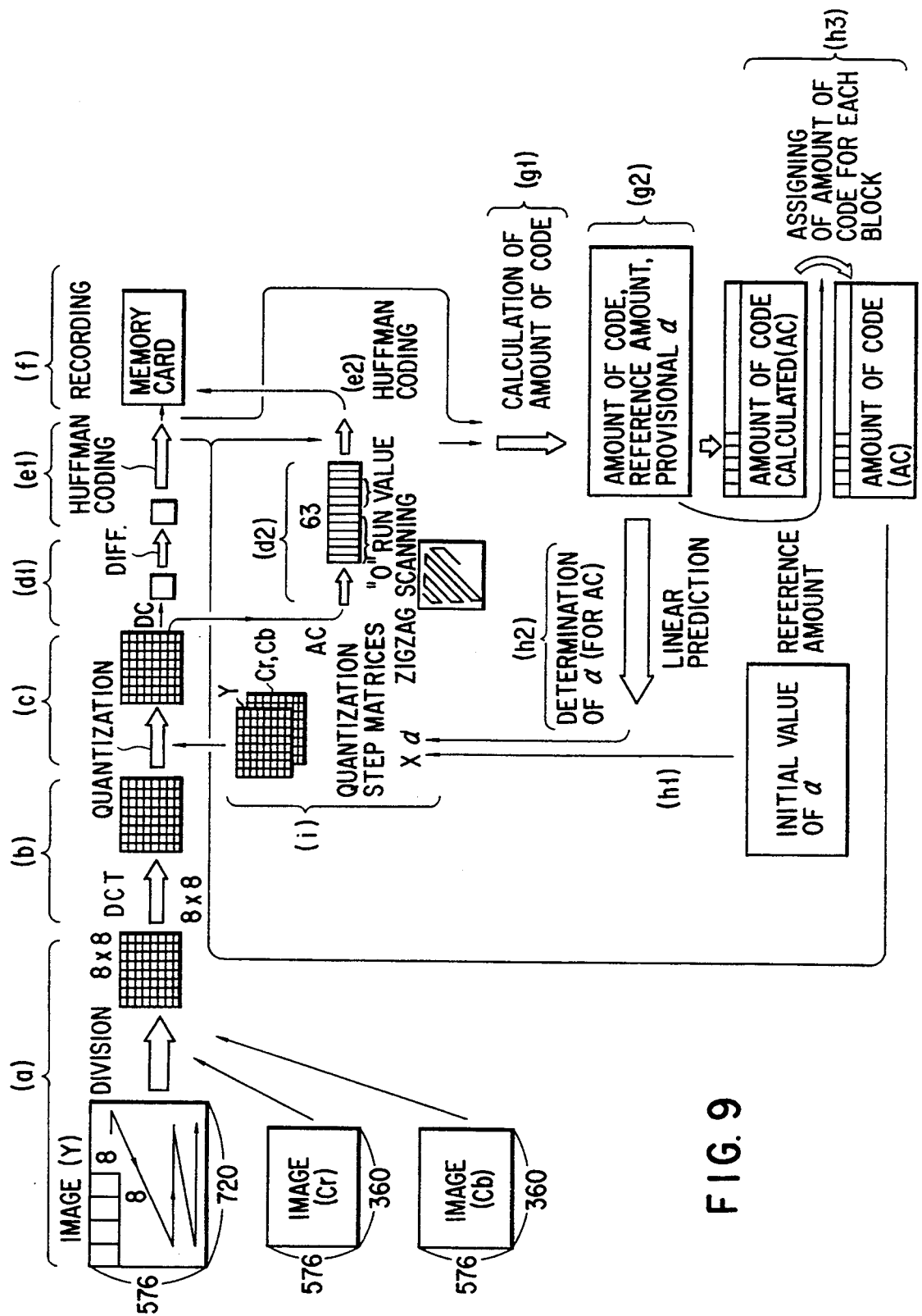
FIG. 9 illustrates the principle operation of the present invention.

Since the first data of the scanning sequence of FIG. 8 is the DC component, the differential value of the data of the DC component is coded by the Huffman coding (in the portions (d1) and (e1) in FIG. 9). The differential value is calculated between the DC component of the block and that of the previous block.

The transformation coefficients of the AC components are sequentially checked in the order from the second to the sixty-fourth of the scanning sequence of FIG. 8. If the transformation coefficient which is non-zero (i.e., valid) is detected, the number (zero run) of the continued zero (invalid) coefficients which is previous to the valid coefficient and the value of the valid coefficient are subjected to the two dimensional Huffman coding (in the portions (d2) and (e2) in FIG. 9).

The variable length coder 8 outputs a code of EOB (End Of Block) indicating the end of the block if the invalid coefficients are continued to the sixty-fourth position of the matrix after a given position. The amount of code data generated is output to the amount of code data calculator 14 (in the portion (g1) in FIG. 9). The entire blocks of one image are processed in the same way.

When the above processing of the Y component is completed, the Cr and Cb components will be similarly processed.

In order to calculate the total amount of image data of Y, Cr, and Cb of the DC and AC components, the amount of code data calculator 14 calculates the amount of code data of the AC components for the blocks and accumulates the amount of code data of the AC and DC components for the entire image (in the portion (g2) in FIG. 9). The amounts of code data of AC components for the blocks are supplied to the amount of code data assigning circuit 20. The amount of code data assigning circuit 20 writes the data of the generated amount of code data of the color component in the table in the assigning circuit 20.

When the Huffman coding for the Y, Cr, and Cb components of the all blocks of the one frame is completed, the amount of code data calculator 14 calculates the reference amount of code data of the AC components which is the maximum of the AC component data by subtracting the total amount of code data of the DC component and the amount of EOB data from the reference amount of code data supplied from the control unit 18. The amount of code data calculator 14 outputs the reference amount of code data of the AC components and the amount of code data of the AC components of the block to the quantization step predicting circuit 12 and the code data assigning circuit 20.

The quantization step predicting circuit 12 predicts an optimum quantization step coefficient α for approximating the amount of code data to the reference amount of code data, for example by using the linear prediction, based on the total amount of code data of the entire image, the reference amount of code data of the AC components, and the provisional quantization step coefficient α used in the statistical process (in the portion (h2) in FIG. 9). The linear prediction will be described later with reference to equation (1).

The first pass operation (determination of the assigned amount of code data of the blocks and optimization of the quantization step coefficient) is performed as described above.

The operation is then transferred to the second pass. The second pass process includes the second coding (coding) to obtain the final coded output of which amount falls within the reference amount of code data.

The second pass process is first executed for the Y component, and after the process of the Y component is completed, the Cr and Cb components are processed.

The signal processing unit 60 supplies the image data of the Y component (luminance) for the respective blocks to the coding unit 80 (in the portion (a) in FIG. 9). The image data supplied to the coding unit 80 is input to the orthogonal transformation circuit 4 and subjected to the orthogonal transformation (in the portion (b) in FIG. 9). The transformation coefficients obtained by the orthogonal transformation are input to the quantizer 6 and quantized (in the portion (c) in FIG. 9). However, the quantization step coefficient a used at this time for the DC component is the provisional quantization step coefficient a used in the first pass and that used at this time for the AC components is the optimum quantization step coefficient which is predicted by the quantization step predicting circuit 12 based on the information obtained in the first pass.

The amount of code assigning circuit 20 calculates the assigned amount of code data of the AC components for the blocks based on the amount of code data of the AC components for the blocks and the amount of the code data of the AC components for the entire image supplied from the amount of code calculator 14 and the reference amount of code data of the AC components. For example, the reference amount of code data of the AC components is proportionally divided in accordance with the ratio of the amount of code data of the AC components to obtain the assigned amount of code data (in the portion (h3) in FIG. 9).

The assigned amount of code data of the AC components for the first block is determined by first multiplying the amount of the code data of the AC components for the first block with the reference amount of code data of the AC components and then dividing the product by the amount of code data of the AC components for the entire image. The assigned amount of code data of the AC components for the first block is supplied to the coder stopping circuit 16. The assigned amount of code data of the AC components for the first block is subtracted from the reference amount of code data and the amount of code data of the AC components of the first block is subtracted from the total amount of code data of AC components for the entire image. For the second block, the new reference amount of code data is used. Due to this change of the assigned amount of code data, the waste of the amount of code data caused from the rounding error of the assignment calculation is prevented.

The coder stopping circuit 16 adds the assigned amount of code data for one block and the remainder of the assigned amount of code data for the previous block as the assigned amount of code data in the block.

The quantized DCT coefficients of the block image are supplied to the variable length coding unit 8. In the variable length coding, similarly to the statistic process, the differential value of the DC component of the DCT coefficients of the image data of the block is first subjected to the Huffman coding (in the portions (d1) and (e1) in FIG. 9), the AC components are then scanned in a zigzag manner, the data are sequentially extracted, and subjected to two dimensional Huffman coding (in the portions (d2) and (e2) in FIG. 9).

When Huffman code is generated for one AC component (one position in the matrix), the amount of code data calculator 14 supplies the amount of code data supplied from the variable length coding unit 8 to the coder stopping circuit 16. The coder stopping circuit 16 does not generate a stop signal if the amount of code data of the AC component for the block to be sent does not exceed the assigned amount of code data, but subtracts the amount of code data from the assigned amount of code data for the block. The coder stopping circuit 16 supplies the stop signal to the variable length coder 8 if the amount of code data of the AC component for the block to be sent exceeds the assigned amount of code data, and does not send the code data. The coding of the block is ended. The coder stopping circuit 16 subtracts the amount of code data to be sent from the assigned amount of code data, and holds the value as the remainder of the assigned amount of code data to be used for the succeeding block. The Huffman coding of the next block output from the quantizer 6 is started by the variable length coder 8.

The variable length coder 8 outputs the Huffman code to the code output circuit 10 until the coder stopping circuit 16 outputs the stop signal. When the coding for all of the blocks are ended before the generation of the stop signal, the variable length coder 8 outputs the EOB code to the code output circuit 10. When the coding for all of the blocks is not ended before the generation of the stop signal, the variable length coder outputs the EOB code instead of the Huffman code to the code output circuit 10. The code output circuit 10 temporarily stores the coded data in the buffer. When a predetermined amount of code data is stored, the code output circuit 10 supplies the code data of the predetermined amount to the recording until 70 to store the code in the recording medium 71 and clears the data in the buffer (in the portion (f) in FIG. 9). The Huffman coding of the next block output from the quantizer 6 is started by the variable length coder 8.

The above-described operation is repeated, and when all the blocks of one frame are completely processed, all the coding processes are ended. If such processes for the luminance component Y are ended, the components Cr and Cb of chrominance will be processed by the similar method. The quantizer 6 uses the provisional quantization step coefficient used in the first pass for the DC component and the predicted optimum quantization step coefficient a calculated by the quantization step predicting circuit 12 in the first pass even in the process of the chrominance component.

When the second pass of all the blocks of the one image of the chrominance components are ended, all the coding processes are ended.

When the coding is ended, the code output circuit 10 outputs the Huffman coded data of one image to the recording unit 70, and writes the data in the recording medium 71 such as a memory card of the recording unit 70 (in the portion (f) in FIG. 9). This is executed by the output of the code output circuit 10. The code output circuit 10 connects the Huffman codes of the variable length codes from the variable length coder 8, supplies the Huffman codes to the recording medium 71, and writes the Huffman codes in the recording medium 71.

It is noted that the writing of the Huffman codes in the recording medium 71 by the code output circuit 10 may be executed together at the stage of ending the second pass (coding) or that, when the connected result of the variable length Huffman codes is gathered at one byte or several bytes unit, the Huffman codes may be sequentially written in the recording medium at the stage of starting the second pass after the first pass (statistic process) is ended.

Before the above-described process, the code output circuit 10 writes the provisional quantization step coefficient used for coding the DC component and the optimum quantization step coefficient used for coding the AC components in a header portion of the stored data of the coded image data to remain as a key at the time of reproducing.

In the embodiment of the apparatus for coding the image data as described above, the statistical processing is first performed using the provisional quantization step coefficient determined in accordance with a desired compression rate. The amount of code data of the DCT coefficient for the DC component is determined. The statistical information for predicting the optimum quantization step coefficients for the AC components and determining the assigned amount of code data of the AC components are obtained by the statistical process. Based on the above information, the optimum quantization step coefficients for the AC components are predicted and the assigned amount of code data of the AC components for each block are determined by using the optimum quantization step coefficients. In the actual coding process, the provisional quantization step coefficient is used for coding the DC component and the optimum quantization step coefficients are used for coding the AC components. The coding of the AC components is controlled such that the generated amount of code data of the block does not exceed the reference amount of code data of the block. This feature is the important point of the present invention.

Therefore, the present invention is not limited to the block size, type of orthogonal transformation, or the type of the variable length coding used in the embodiment described above.

Further, the statistic process is not always a necessarily once, but no statistic process may be employed or the statistic processes may be employed a plurality of times. When the statistic process is performed by a plurality of times, the provisional quantization step coefficient for the DC component can be optimized.

It is not always necessary to assign all the reference amount of code data to the reference amount of code data for each block, but the remainder when the reference total amount of code data is, for example, assigned to the reference amount of code data for each block not to be divided may be applied to the first block as an excessive or insufficient portion to the previous block.

It is noted that the compression rate may not always be variable, but fixed to one type of compression rate, and the reference total amount of code data, the quantization step, the reference amount of code data for each block may be all applied as fixed values. In such a case, the configuration of the apparatus may be simpler.

The image data buffer memory 60c (FIG. 2) may be disposed between the orthogonal transformation circuit 4 and the quantizer 6 shown in FIG. 3. In this case, the blocking and the orthogonal transformation process in the coding process may be omitted. However, in order to hold the accuracy, the size of the image memory in this case will be increased.

The processing may be performed before the A/D conversion, and the digitization may be performed after the A/D conversion.

In the apparatus of this embodiment, the variable length coding of the respective blocks is executed from the lower frequency components and the high frequency component which has a relatively small visual influence to the quality of the image is omitted by the stopping of the coding. Therefore, the deterioration of the quality of the image is suppressed to a minimum limit, and encoded in high compression.

The embodiment of the present invention with the configurations shown in FIGS. 2 and 3 is in summary as follows. The amount of code data of the DC component is determined based on the statistic data and the quantization step coefficient for the AC components is predicted. The amount of code data of the AC components of the block is also predicted and is set as the assigned amount of code data of the block. The quantized transformation coefficients are coded while monitoring the amount of code data of the AC components of the respective blocks so that the amount of code data of the AC components falls within the assigned amount of code data for the block obtained by adding the reference amount of code data of one block and the remainder of the amount of code data of the previous blocks. If the amount of code data exceeds the assigned amount of code data, the coding of the block is ended, and the remainder of the amount of code data is stored. The coding operation for the next block is started. Thus, the AC components of the transformation coefficients are quantized by using the predicted quantization step coefficient.

As described above, the amount of code data of the DC component of the transformation coefficient is calculated in the statistic process and is maintained in the coding process. The AC components of the transformation coefficients are coded such that the amount of code data falls within the amount of code data obtained by subtracting the amount of code data of the DC component from the reference amount of code data of one image. Therefore, the amount of code data cannot exceeds the reference amount of code data of one image.

As a result, the coding of the DC component of the transformation coefficient which is necessary for coding the image cannot be stopped. The coding of the AC components of the transformation coefficients is performed such that the amount of code data falls within the reference amount of code data and the coding of the AC components of the transformation coefficients which is not absolutely necessary for coding the image is stopped when the amount of code data exceeds the reference amount of code data.

According to the present invention, the image data can be coded in a predetermined processing time by a simple coding apparatus wherein the amount of code data cannot exceeds a predetermined level while keeping the decrease of the quality of the image at a minimum.

It is important for the present invention how the provisional quantization step coefficient is determined. When the image data is pre-processed and the preprocessed image data is quantized and coded by a variable length coding system, the amount of code data is varied by changing the quantization step. Since the variable length coding, such as the Huffman coding, reduces the amount of code data representing the image data by utilizing a nonuniformity of the histogram of the generated code data, a change in the quantization step corresponds to a change in the generation probability of quantization values. Therefore, the amount of code data can be changed by changing the quantization step.

Even if the same quantization step and the same coding system are used, the amount of code data varies for the kind of image data. However, there is a predetermined relationship between the quantization step and the amount of code data where the same image data is coded several times using the different quantization steps and the same coding system. Where the relationships between the quantization step and the amount of code data of the plural image data are investigated, there is a most frequent relationship.

The following relationship is obtained in many cases. Here, the ratio between the reference quantization step and the actual quantization step is the quantization step coefficient a and the number of bits of the pixel code data (bit rate) is the amount of code data.

$$\log BR = a \times \log a + b \tag{1}$$

where a is a constant dependent on the apparatus and therefore is substantially constant in the same coding system regardless of the type of the image and b is a constant dependent on the image data. The value of "b" has a distribution for the image and the typical value of "b" is determined based on the distribution histogram.

The coding unit 80 with the configuration shown in FIG. 3 performs the first pass process using the provisional quantization step determined in accordance with the reference amount of code data, determines the amount of code data of the DC component of the transformation coefficient based on the result of the first pass process, predicts the optimum quantization step of the AC components of the transformation coefficients, and calculates the amount of code data to be assigned to the blocks. In the second pass process, the DC component of the transformation coefficient is quantized by using the provisional quantization step, the AC components of the transformation coefficients are quantized by using the predicted optimum quantization step, and the coding of the AC components of the transformation coefficients is stopped when the amount of code data exceeds the reference amount of code data. According to the present invention, the image data is always compressed and coded in the two processes in which the amount of code data of the DC component of the transformation coefficient, the optimum quantization step of the AC components of the transformation coefficients, and the amount of code data to be assigned to the blocks are obtained in the first pass.

Figure 4:
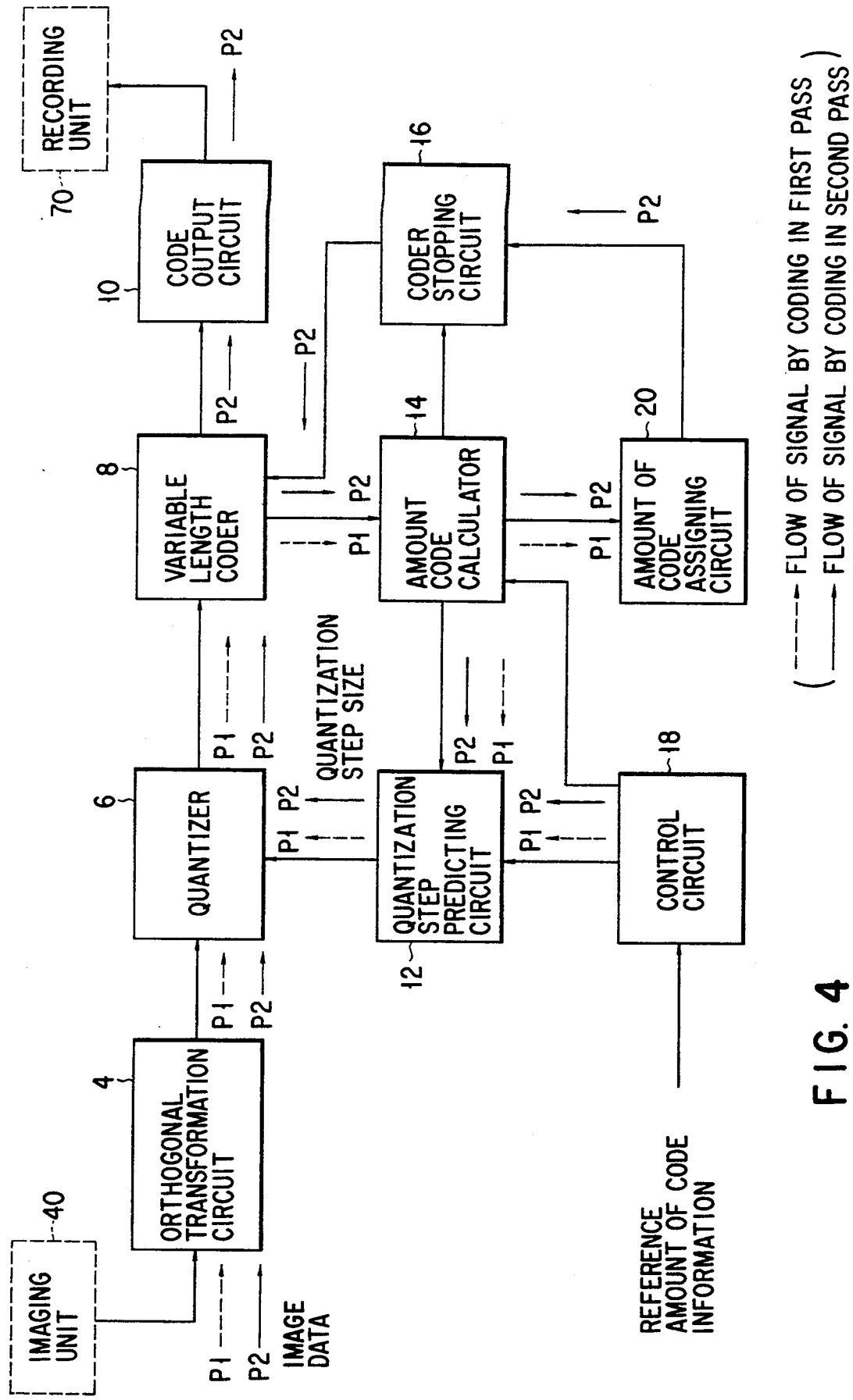
FIG. 4 is a block diagram for describing the flow of the signal in the coding unit shown in FIG. 3.

In FIG. 4, the flow of the signal of the first pass is indicated by an arrow P1 with a broken line and the flow of the signal of the second pass is indicated by an arrow P2 with a solid line for the sake of easy understanding of the flow of the process of the coding unit 80. The operation of the coding unit 80 will be briefly traced along the flows of the signals as follows.

The reference total amount of code data of one image is set in the control circuit 18 of the coding unit 80 to code the image data. This process is carried out by the operation of the switch 30 to set the desired number of the images to be photographed by the user, selecting the optimum amount of code data by the control unit 90 in response to the set number of the images, and applying the optimum amount of code data as the data of the reference total amount of code data to the coding unit 80. A predetermined reference number of images is set in an initial state.

In the photographing, an image signal is output from the imaging element in the imaging unit 40. The output image signal is converted to a digital signal in the signal processing unit 60, stored in the buffer memory, read out at a block unit of 8×8, and separated to the Y component, the Cr component, and the Cb component. The Y component is initially separated, the image data of the Y component output at the block unit of pixels of 8×8 is input to the orthogonal transformation circuit 4, and subjected to an orthogonal transformation (Discrete Cosine Transformation in this embodiment).

The DCT coefficients obtained by the orthogonal transformation circuit 4 are input to the quantizer 6. The reference total amount of code data from the control circuit 18 is output to the quantization step predicting circuit 12. The quantization step predicting circuit 12 calculates the initial value of the quantization step coefficient by using the reference amount of code data (BR in equation (1)) and the relationship of equation (1) and outputs the initial value to the quantizer 6. The quantizer 6 linearly quantizes the transformation step coefficients by using the input quantization step coefficient $\alpha$. The quantized transformation step coefficients are input to the variable length coder 8, and subjected to the variable length coding (the Huffman coding in this embodiment).

The transformation coefficients input as described above are scanned from low to high frequency components called "a zigzag scanning", and the differential value of the data of the DC component from the DC component of the previous block is subjected to the Huffman coding and output.

The transformation coefficients for the AC components are sequentially checked in the order from the second to the sixty-fourth of the scanning sequence shown in FIG. 8. If the transformation coefficient which is not zero (i.e., valid) is present, the number (zero run) of the continued zero (invalid) coefficients present immediately before the valid coefficient and the value of the valid coefficient are subjected to the two-dimensional Huffman coding. The variable length coder 8 supplies a code of EOB (End Of Block) indicating the end of the block if the invalid coefficients are continued to the coefficient of the sixty-fourth position of the zigzag scanning after the certain position of the scanning sequence. Then, the amount of code data is output to the amount of code data calculator 14 each time when one code is generated.

The amount of code data calculator 14 accumulates the input amount of code data at the respective color components, and stores the amount of code data.

When the Y component is completely processed as described above, the Cr component and then Cb component will be similarly processed.

When the coding of one image is ended, the amount of code data calculator 14 adds the accumulated amount of code data of the respective color components, and calculates the amount of code data of the entire image as total amount of code data. The total amount of code data is output to the quantization step predicting circuit 12, and the amount of code data of the respective color components and the amount of code data of the entire image are output to the amount of code data assigning circuit 20.

When the coding of the first pass is ended as described above, the quantization step predicting circuit 12 predicts the more suitable quantization step coefficient from the total amount of code data obtained in the first pass and the reference amount of code data applied from the control circuit 18, and outputs the quantization step coefficient to the quantizer 6. The amount of code data assigning circuit 20 calculates the reference amount of code data for each block at the respective color components from the amount of code data at the respective color component input from the amount of code data calculator 14, the amount of code data of the entire image, the reference total amount of code data and the number of blocks.

Then, the coding of the second pass is executed for the same image data. In the second pass, the image data read out from the signal processing unit 60 is separated to the Y component, the Cr component, and the Cb component, and the image data of the respective components are divided into blocks of pixels of 8×8. The image data of the pixel unit of 8×8 of the blocks are input to the orthogonal transformation circuit 4, subjected to the orthogonal transformation (DCT transformation) at the respective blocks, and the DCT transformation coefficients obtained by the orthogonal transformation circuit 4 are input to the quantizer 6.

In the quantization step predicting circuit 12, an optimum quantization step coefficient a is predicted based on the total amount of code data of the AC components of the DCT coefficients obtained in the first pass, the reference amount of code data of the AC components of the DCT coefficients, and the provisional quantization step coefficient and the predicted coefficient is supplied to the quantizer 6. In the quantizer 6, the DC component of the DCT coefficient is linearly quantized by using the provisional quantization step and the AC components of the DCT coefficients are linearly quantized by using the optimum quantization step. The quantized step coefficient is input to the variable length coder 8, and subjected to the Huffman coding in the same manner as in the first pass.

Before the Huffman coding for the respective blocks is started, the amount of code data assigning circuit 20 calculates the amount of code data to be assigned to the blocks as described above and supplies the assigned amount of code data to the coder stopping circuit 16.

In the coding operation, the amount of code data of the AC components of the DCT coefficients is compared with the assigned amount of code data supplied from the amount of code data assigning circuit 20 by the coder stopping circuit 16. When the amount of code data of the AC components of the DCT coefficients exceeds the assigned amount of code data, the coder stopping circuit 16 sends forth the stop signal to the variable length coder 8 to stop the coding and not to output the code data within the block. Thus, the Huffman coding is stopped.

The coded data whose amount is controlled to be within the reference amount of code data are sequentially output to the recording unit 70 through the code output circuit 10 and recorded in the recording unit 70 according to the method as described above.

Figure 5:
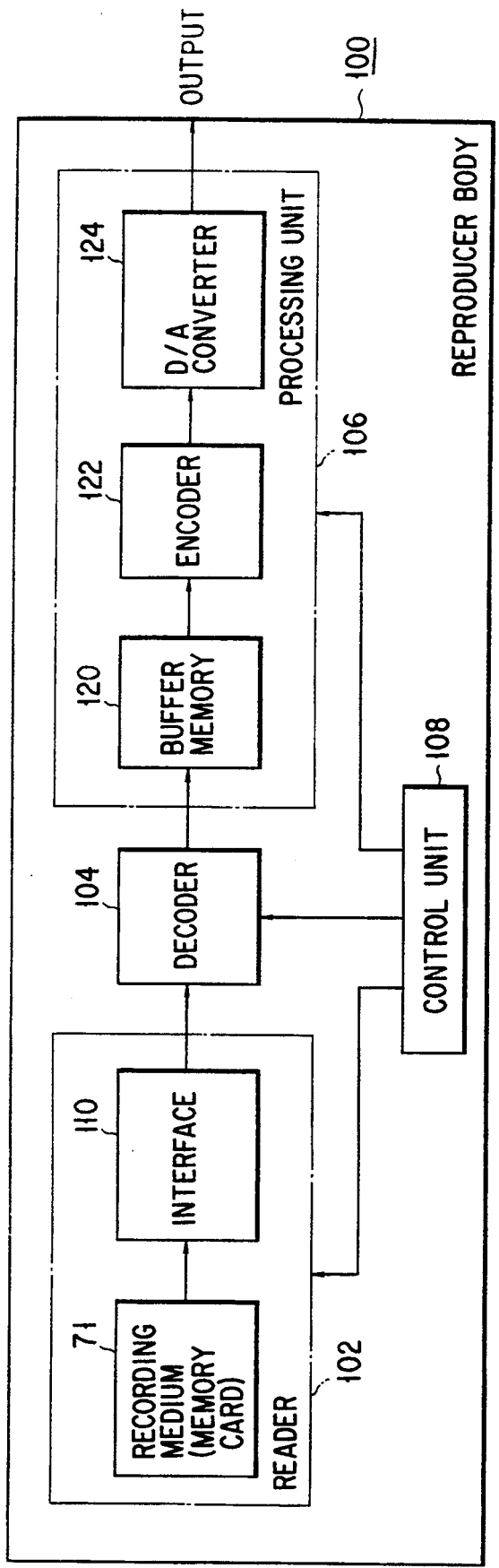
FIG. 5 is a block diagram showing a configuration of an apparatus for reproducing the coded image data according to the present invention.

Then, the reproduction or play-back of the compressed image code data in the recording medium 71 recorded by the recording unit 70 will be described. FIG. 5 shows a configuration of the reproducer body or playback system 100. As shown in FIG. 5, the reproducer body 100 has a reader 102, a decoder 104, a processing unit 106, and a control unit 108. To the reader 102 the recording medium 71 is detachably attached. The reader 102 reads out the content of the recording medium 71 through an interface 110.

Figure 6:
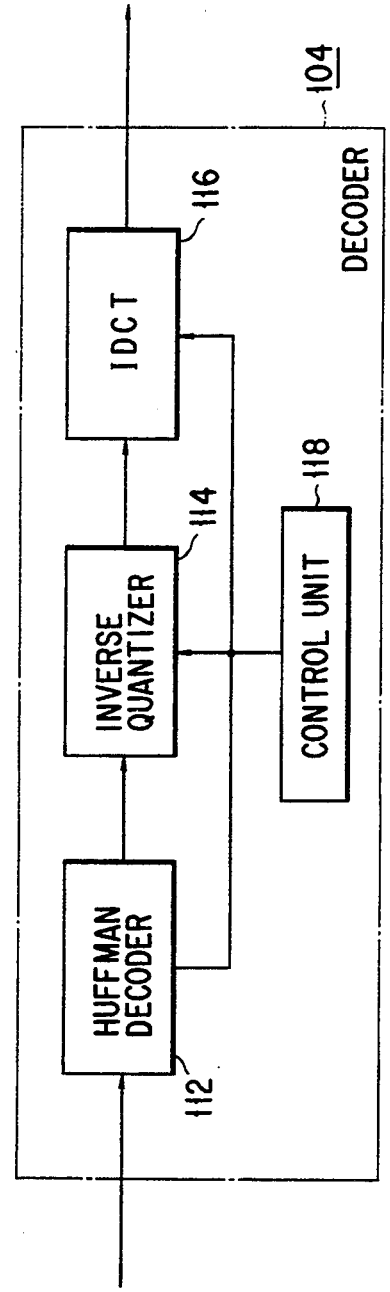
FIG. 6 is a block diagram showing a details of a decoder in the apparatus shown in FIG. 5.

The decoder 104 has functional blocks as shown in FIG. 6. The Huffman decoder 112 decodes the Huffman-coded data. An inverse quantizer 114 performs an inverse quantization of the data obtained by Huffman decoding on the basis of the data of the quantization step read out from the input from the recording medium 71. An IDCT (inverse DCT transformation) unit 116 performs an inverse DCT transformation of the data obtained by the inverse quantization, and outputs it as image signal data. A control unit 118 controls the entire system of the decoder 104.

The processing unit 106 shown in FIG. 5 has a buffer memory 102, an NTSC encoder 122, and a D/A converter 124. The buffer memory 120 temporarily stores the image signal data output from the decoder 104. The NTSC encoder 122 transforms the image signal data read out from the buffer memory 120 into a video signal of the NTSC system. The D/A converter 124 converts the digital video signal of the NTSC system into an analog signal, and outputs the analog signal as a video signal for a television.

The control unit (microprocessor) 108 controls the entire reproducer body 100, controls the reader 102 of the playback system 100 to read out the data of quantization step used for coding, and resultantly sets the data of the quantization step read out from the recording medium 71 to the inverse quantizer 114 of the decoder 104. The control unit 108 controls the reader 102 to read out the compressed video signal coded data from the recording medium 71. The control unit 108 controls the above operations. The reproducer body 100 has, though not shown, a frame forward switch, and reproduces or plays back the video of the frame position specified by this switch. The control unit 108 also controls the above operation.

The operation of the playback system with the configuration as described above will be described. When the recording medium (memory card) 71 in which the compressed and coded video signal data is recorded is mounted in the reader 102 of the reproducer body 100, the control unit 108 first controls the reader 102 to read out the data of the quantization step for coding. As a result, the data of the quantization step is read out in the reader 102, and the data is set in the inverse quantizer 114 of the decoder 104. Then, since the control unit 108 controls the reader 102 to read out the video signal from the recording medium 71, the reader 102 sequentially reads the video signals from the recording medium 71, and inputs the video signal to the decoder 104.

The decoder 104 which receives the video signal, decodes the Huffman-code at the Huffman decoder 112 to obtain a quantization step coefficient. The quantization step coefficient obtained in this manner is set in the inverse quantizer 114. The inverse quantization is performed by using the data of the set quantization step.

The transform coefficients obtained by the inverse quantization are subjected to the inverse DCT transformation in the respective blocks in the IDCT unit 116, and decoded to the original video signal. Thus, the video signal is decoded sequentially in the order of Y, Cr, and Cb, and output from the decoder 104, and written in the buffer memory 120 in the processing unit 106. When the writing of the video signal data of one image is ended, image signal data is read out in the scanning sequence of the NTSC signal from the buffer memory 120. The video signal data read out as described above is transformed to video signal data of the NTSC system in the NTSC encoder 122. The video signal data is further converted to an analog signal by the D/A converter 124, and output as the video signal. The video signal is reproduced or played back as a television video image by inputting the video signal to a television monitor, observed as the video, and a hard copy is obtained by applying the video signal to a printer of a video printer and printing the video image, and hence the video image can be observed in the same manner as a photograph.

As described above, in the electronic still camera, a desired number of images to be picked-up can be set, and a suitable compression rate can be automatically set in accordance with the desired number of images. The image data is quantized by using the provisional quantization step determined in accordance with the set compression rate. The optimum quantization step of the AC components is predicted based on the amount of code data of the AC components obtained under the condition in which the image data is quantized by using the provisional quantization step. The provisional quantization step is set as the optimum quantization step of the DC component. The image data is subjected to the entropy coding by using the optimum quantization step and the code data is decoded by using this optimum quantization step. As a result, the coding at a desired compression rate is performed by using a common hardware without providing respective hardwares according to the compression rates, and the image data coded at the desired compression rate is similarly decoded by using a common hardware without providing respective hardwares according to the compression rates.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

For example, the coding is performed by two processes, i.e., the first pass and the second pass. However, the present invention is not limited to the two-pass system. For example, an at least three-pass system can be employed and the quantization step coefficient of the DC component can be also optimized in one pass. An example of the recording medium is the memory card. However, another recording medium may be used. For example, floppy disks, optical disks, magnetic tapes may be used. Though the camera and the playback system are separate, the camera may be integral with the function of the playback system. Further, the value of the quantization step is recorded in the above embodiment. However, the value of the quantization step may be transformed or coded, and recorded. The orthogonal transformation is not limited to the discrete cosine transformation, and may be a K-L transformation. In the embodiment, the provisional quantization step is set based on the reference amount of code data. However, in an application in which a plurality of reference amounts of code data are provided for the respective modes, the quantization steps corresponding to the modes are predetermined in accordance with the modes and selected according to the mode. The present invention may be applied not only to the still image but compression coding of various images such as a motion picture.

According to the present invention, an image data compressing and coding apparatus is provided in which the amount of code data is compressed within a predetermined level while keeping the decrease of the quality of image at the a minimum in a short time.

What is claimed is:

1. An apparatus for dividing image data into blocks with a predetermined size, subjecting the image data of the blocks to an orthoganol transformation to obtain orthogonal transformation coefficients, quantizing the orthogonal transformation coefficients with quantizing means, and compressing and coding the quantized orthogonal transformation coefficients with variable length coding means, the apparatus comprising:

means for calculating an amount of code data based on the output from said variable length coding means;

control means for providing a reference amount of code data of the image data of one frame and sending forth a statistic process instruction and a coding process instruction after the completion of the statistic process;

setting means for supplying to said quantizing means provisional quantization step data corresponding to the reference amount of code data supplied from said control means in the statistic process and the provisional quantization step data for a DC component of the orthogonal transformation coefficients and an optimum quantization step data for an AC component of the orthogonal transformation coefficients, the optimum quantization step data corresponding to a remainder amount of code data obtained by subtracting the amount of code data of the DC component which is quantized by using the provisional quantization step data from the reference amount of code data set by said control means;

means for calculating an amount of code data to be assigned to each block based on an amount of code data obtained in the statistic process and the reference amount of code data; and means for stopping the coding operation of said variable length coding means in the coding process when the amount of code data of a block exceeds the assigned amount of code data of the block, and wherein said quantizing means quantizes the orthogonal transformation coefficients in accordance with the provisional and optimum quantization step data.

2. An apparatus for dividing image data into blocks, subjecting the image data of the blocks to an orthogonal transformation to obtain orthogonal transformation coefficients, quantizing the orthogonal transformation coefficients with quantizing means in accordance with a provisional quantization step data, compressing and coding the quantized orthogonal transformation coefficients which are quantized with a variable length coding means in accordance with the provisional quantization step data, calculating an amount of code data, predicting an optimum quantization step data based on the amount of code data, dividing the image data into blocks, subjecting the block data to the orthogonal transformation to convert the image data to the transformation coefficients, quantizing the transformation coefficients with the quantizing means in accordance with the optimum quantization step data, compressing and coding the quantized transformation coefficients with the variable length coding means, and controlling the coding operation of the variable length coding means by controlling the amount of code data based on the amount of code data to be assigned to the block in accordance with the amount of code data of the block, the apparatus comprising:

predicting means for predicting the optimum quantization step data for the transformation coefficients of the AC components and setting the provisional quantization step data for the transformation coefficient of the DC component as the optimum quantization step data;

assigning means for predicting the amount of code data of the transformation coefficient of the AC components based on the predicted quantization step data and data obtained in a statistic process, setting the predicted amount of code data as the assigned amount of code data of the block, calculating a remainder of the amount of code data for the previous blocks, amending an assigned amount of code data for the block by adding the remainder thereto; and means for stopping the coding operation of the variable coding means for the transformation coefficients of the AC components of the block when the amount of code data of the block exceeds the assigned amount of code data of the block.

3. An apparatus for dividing image data into blocks, subjecting the image data of the blocks to an orthogonal transformation to obtain orthogonal transformation coefficients, quantizing the orthogonal transformation coefficients with quantizing means in accordance with a provisional quantization step data, compressing and coding the quantized orthogonal transformation coefficients which are quantized with a variable length coding means in accordance with the provisional quantization step data, calculating the amount of code data, predicting an optimum quantization step data based on the amount of code data, dividing the image data into blocks, subjecting the block data to the orthogonal transformation to convert the image data to the transformation coefficients, quantizing the transformation coefficients with the quantizing means in accordance with the optimum quantization step data, compressing and coding the quantized transformation coefficients with the variable length coding means, and controlling the coding operation of the variable length coding means by controlling the amount of code data based on the amount of code data to be assigned to the block in accordance with the amount of code data of the block, the apparatus comprising:

predicting means for predicting the optimum quantization step data for the transformation coefficients of the AC components and setting the provisional quantization step data for the transformation coefficient of the DC component as the optimum quantization step data;

assigning means for predicting the amount of code data of the transformation coefficient of the AC components based on the predicted quantization step data and data obtained in a statistic process, setting the predicted amount of code data as an assigned amount of code data of the block, calculating a remainder of the amount of code data for the previous blocks, amending the assigned amount of code data for the block by adding the remainder thereto; and means for stopping the coding operation of the variable coding means for the transformation coefficients of the AC components of the block when the amount of code data of the block exceeds the assigned amount of code data of the block, and wherein said variable length coding means comprises first coding means for differentiating the transformation coefficients of the DC component for a block with respect to the transformation coefficients of the previous block and subjecting the differential value to the variable length coding and second coding means for subjecting the transformation coefficients of the AC components after the coding of the DC component, and said coding operation stopping means comprises means for stopping the operation of said second coding means.

4. An image data compressing and coding method for dividing image data into blocks with a predetermined size, subjecting the image data of the blocks to an orthogonal transformation to convert the image data to transformation coefficients for respective frequency components, quantizing the transformation coefficients with quantizing means, and compressing and coding the quantized transformation coefficients with variable length coding means, the method comprising:

a statistic step; and a coding step which is executed after the statistic step, the statistic step comprising the substeps of:

quantizing the transformation coefficients in accordance with predetermined provisional quantization step data, calculating an amount of code data of a variable length code of the quantized transformation coefficients quantized in accordance with the provisional quantization step data, predicting an optimum quantization step data for the transformation coefficients of the AC components based on the amount of code data of the variable length code and a reference amount of code data, determining the amount of code data to be assigned to the block, and setting the provisional quantization step data as the optimum quantization step data for the transformation coefficient of the DC component, and the coding step comprising the substeps of:

quantizing the transformation coefficients in accordance with the optimum quantization step data, calculating the amount of code data of the variable length code of the quantized transformation coefficients quantized in accordance with the optimum quantization step data, and controlling the output of the variable length code such that the amount of code data of the block does not exceed an assigned amount of code data.

5. An image data compressing and coding method for dividing image data into blocks, subjecting the block data to an orthogonal transformation to convert the image data to transformation coefficients, quantizing the transformation coefficients by quantizing means in accordance with provisional quantization step data, compressing and coding the quantized transformation coefficient with variable length coding means, calculating a amount of code data, predicting an optimum quantization step data based on the amount of code data, dividing the image data into blocks, subjecting the block data to the orthogonal transformation to convert the image data to transformation coefficients, quantizing the transformation coefficients with the quantizing means in accordance with the optimum quantization step data, compressing and coding the quantized transformation coefficients with the variable length coding means, and controlling the coding operation of the variable length coding means by controlling the amount of code data based on the amount of code data to be assigned to the block in accordance with the amount of code data of the block, the method comprising:

a first step of performing the quantizing and coding in accordance with the provisional quantization step data and calculating the amount of code data of the entire image data and the amount of code data of the transformation coefficients of the AC components;

a second step of predicting the optimum quantization step data for the transformation coefficients of the AC components based on the amount of code data of the entire image and setting the provisional quantization step data as the optimum quantization step data for the transformation coefficient of the DC components;

a third step of quantizing the transformation coefficients in accordance with the optimum quantization step data; and a fourth step of calculating the amount of code data of the AC components to be assigned to the block based on the amount of code data of the AC components of the block and the predicted quantization step data and performing the variable length coding such that the amount of code data of the block does not exceed the sum of the amount of code data assigned to the block and the amount of code data of the remainder of the previous blocks.

6. An apparatus for coding image data wherein an amount of code data is compressed within a reference amount of code data, the apparatus comprising:

orthogonal transforming means for dividing the image data into blocks with a predetermined size an subjecting the image data of the blocks to an orthogonal transformation to obtain orthogonal transformation coefficients for respective frequency components;

means for quantizing the orthogonal transformation coefficients in accordance with predetermined quantizing coefficient data;

coding means for subjecting the quantized orthogonal transformation coefficients to a variable length coding;

means for calculating the amount of code data for the respective blocks based on the output from said coding means;

mode setting means for setting an operation mode of the apparatus first in a statistic process mode and then in a coding process mode;

statistic process means, operated in the statistic process mode, for supplying provisional quantization step data to said quantizing means and calculating optimum quantization step data for the orthogonal transformation coefficients of the AC components and the amount of code data of the orthogonal transformation coefficients of the AC components to be assigned to the block based on the amount of code data of the blocks and the reference amount of code data; and coding process means, operated in the coding process mode, for supplying the provisional quantization step data to said quantizing means as the optimum quantization step data for the orthogonal transformation coefficient of the DC component and the optimum quantization step data calculated by the statistic process means to said quantizing means as the optimum quantization step data for the orthogonal transformation coefficients of the AC components and stopping the coding operation of said coding means when the amount of code data of a block exceeds as assigned of code data of the block.

7. An apparatus according to claim 6, in which said coding process means comprises means for amending the assigned amount of code data of the orthogonal transformation coefficients of the AC components by adding the remainder of the amount of code data of the previous blocks thereto.

8. An apparatus according to claim 6, in which said coding means comprises first coding means for differentiating the transformation coefficient of the DC component for a block with respect to the transformation coefficients of the previous block and subjecting the differential value to the variable length coding and second coding means for subjecting the transformation coefficients of the AC components after the coding of the DC component, and said coding process means comprises means for stopping the operation of said second coding means.

9. An apparatus according to claim 6, in which said orthogonal transforming means comprises means for subjecting the quantized orthogonal transformation coefficients to a discrete cosine transformation.

10. An apparatus according to claim 6, in which said quantizing means comprises a quantization step matrix having quantization step data for the respective frequency components, means for multiplying a predetermined coefficient data to the quantization step data stored in the quantization step matrix, and means for quantizing the orthogonal transformation coefficients in accordance with the result of this multiplication.

11. An apparatus according to claim 6, in which said coding means comprises:

DC coding means for grouping a differential value of the transformation coefficient of the DC component for a block with respect to the transformation coefficients of the previous block to obtain a group number and an additional bit, subjecting the group number to a one dimensional Huffman coding, and combining a Huffman code of the group number and the additional bit to form coded data; and AC coding means for scanning the transformation coefficients of the AC components in a zigzag manner to obtain a run length of continuous invalid coefficients and a value of valid coefficient following the continuous invalid coefficients and subjecting the run length and the value of the valid coefficient to a two-dimensional Huffman coding.

12. An apparatus for coding image data wherein an amount of code data is compressed within a reference amount of code data, the apparatus comprising:

orthogonal transforming means for dividing the image data into blocks with a predetermined size and subjecting the image data of the blocks to an orthogonal transformation to obtain orthogonal transformation coefficients for respective frequency components;

means for quantizing the orthogonal transformation coefficients in accordance with predetermined quantizing coefficient data;

coding means for subjecting the quantized orthogonal transformation coefficients to a variable length coding;

means for calculating the amount of code data for the respective blocks based on the output from said coding means;

mode setting means for setting an operation mode of the apparatus first in a statistic process mode and then in a coding process mode;

statistic process means, operated in the statistic process mode, for supplying provisional quantization step data to said quantizing means and calculating optimum quantization step data for the orthogonal transformation coefficients of the AC components and the amount of code data of the orthogonal transformation coefficients of the AC components to be assigned to the block based on the amount of code data of the blocks and the reference amount of code data, and said statistic process means calculates the provisional quantization step data $\alpha$ in accordance with a reference amount of code data BR based on a linear prediction as follows:

$$\log BR = a \times \log \alpha + b$$

where a is a constant dependent on the apparatus and b is a constant dependent on the image data; and coding process means, operated in the coding process mode, for supplying the provisional quantization step data to said quantizing means as the optimum quantization step data for the orthogonal transformation coefficient of the DC component and the optimum quantization step data calculated by the statistic process means to said quantizing means as the optimum quantization step data for the orthogonal transformation coefficients of the AC components and stopping the coding operation of said coding means when the amount of code data of a block exceeds an assigned amount of code data of the block.

13. An apparatus according to claim 6, in which said statistic process means calculates the assigned amount of code data of the orthogonal transformation coefficients of the AC components of the block by dividing the reference amount of code data in accordance with the amount of code data of the orthogonal transformation coefficients of the AC components of the block.

14. An apparatus according to claim 6, in which said coding means detects whether or not the amount of code data of the block is smaller than the assigned amount of code data of the block after the coding of the orthogonal transformation coefficients for the respective frequency components, codes the next block data and outputs end-of-block data after the code of the orthogonal transformation coefficient for the highest frequency component when the amount of code data of the block is smaller than the assigned amount of code data of the block, and outputs the end-of-block data instead of the code of the orthogonal transformation coefficient when the amount of code data of the block is not smaller than the assigned amount of code data of the block.

15. An apparatus according to claim 6, in which said statistic process means calculates the optimum quantization step data for the transformation coefficient of the DC component based on the amount of code data of the block and the reference amount of code data and said coding process means supplies the optimum quantization step data for the transformation coefficient of the DC component to said quantizing means.

16. An apparatus according to claim 6, further comprising:
means for storing the orthogonal transformation coefficients of the blocks obtained in the statistic process mode; and
means for supplying the stored orthogonal transformation coefficients of the blocks to said quantizing means in the coding process mode.

17. An electronic still camera apparatus for picking-up a still image of an object and recording image data in a recording medium after coding the image data wherein an amount of code data is compressed within a reference amount of code data, the apparatus comprising:
coding means for dividing the image data into blocks and subjecting the image data of the blocks to an orthogonal transformation, quantization, and variable length coding;
means for calculating the amount of code data for the respective blocks based on the output from said coding means;
statistic process means for supplying provisional quantization step data to said coding means and calculating optimum quantization step data for the orthogonal transformation coefficients of the AC components and the amount of code data of the orthogonal transformation coefficients of the AC components to be assigned to the block based on the amount of code data of the blocks and the reference amount of code data;
coding process means for supplying the provisional quantization step data to said coding means as the optimum quantization step data for the orthogonal transformation coefficient of the DC component and the optimum quantization step data calculated by the statistic process means to said coding means as the optimum quantization step data for the orthogonal transformation coefficients of the AC components and stopping the coding operation of said coding means when the amount of code data of a block exceeds the assigned amount of code data of the block;
control means for operating said statistic process means first and then operating said coding process means; and
means for recording the code data obtained by said coding means in the recording medium.

18. An apparatus according to claim 17, further comprising means for setting the number of images to be recorded in said recording medium and means for setting the reference amount of code data in accordance with the set number of images to be recorded in said recording medium.

19. An apparatus according to claim 17, in which said coding means separates a color image signal into a luminance component, a first chrominance component which is a difference between the luminance component and a red component, and a second chrominance component which is a difference between the luminance component and a blue component, and subjects the image data of the respective components to a block division, an orthogonal transformation, a quantization, and a variable length coding and said statistic process means sets provisional quantization step data for the luminance component and the chrominance component, respectively.

* * * * *

UNITED STATES PATENT AND TRADEMARK OFFICE
CERTIFICATE OF CORRECTION

PATENT NO. : 5,335,016
DATED : August 2, 1994
INVENTOR(S) : NAKAGAWA

It is certified that error appears in the above-indentified patent and that said Letters Patent is hereby corrected as shown below:

On the Title page, item [56], References Cited,

U.S. PATENT DOCUMENTS, after

"5,079,621  1/1992  Daly et al...............358/133"

Insert the following:

```
--4,780,761 10/1988  Daly et al....358/133
  4,386,373  5/1983  Kondo et al...358/260
  4,982,282  1/1991  Saito.........358/133
```

FOREIGN PATENT DOCUMENTS

```
DE  3111823   A1   3/1982....GERMANY
DE  3735349   A1   4/1988....GERMANY
DE  3800634   A1   7/1988....GERMANY
DE  3709094   A1  10/2988....GERMANY
    0 283 715 A2   2/1988....EUROPE
JP-63-227272       9/1988....JAPAN
```

UNITED STATES PATENT AND TRADEMARK OFFICE
CERTIFICATE OF CORRECTION

PATENT NO. : 5,335,016  Page 2 of 2
DATED : August 2, 1994
INVENTOR(S) : NAKAGAWA It is certified that error appears in the above-indentified patent and that said Letters Patent is hereby corrected as shown below:

OTHER PUBLICATIONS

"TRANSFORMATIONEN ZUR dATENKOMPRESSION VON GRAUWERBILDERN" Dipl.Phys. Steffen Mehnert Bild Und Ton 40 (1980) 9pp. 261-268

"DIGITAL STILL VIDEO CAMERA USING SEMICONDUCTOR MEMORY CARD" F. Izawa, et al., IEEE Transactions on Consumer Electronics, Vol. 36, No. 1, Febr. 1980, pp 1-9

"PERFORMANCE OF BLOCK COSINE IMAGE CODING WITH ADAPTIVE QUANTIZATION", James W. Modestino, IEEE Transactions on Communications, Vol. COM-33, No. 3, March 1985, pp. 210-217

"IMAGE DATA COMPRESSION: A REVIEW" Anil K. Jain, Proceedings of the IEEE, Vol. 69, March, 1981, pp. 349-384

"Adaptive Coding of Monochrome and Color Images"; IEEE TRANSACTIONS ON COMMUNICATIONS, VOL. COM. 25, NO. 11, NOVEMBER 1977, pp. 1285-1292.--

Signed and Sealed this

Sixth Day of August, 1996

Attest:

BRUCE LEHMAN

Attesting Officer   Commissioner of Patents and Trademarks